United States Patent
Nose et al.

(10) Patent No.: US 11,156,168 B2
(45) Date of Patent: Oct. 26, 2021

(54) GAS TURBINE PLANT HAVING THERMAL DECOMPOSITION OF AMMONIA AND PRESSURIZATION OF THE DECOMPOSED GAS AND METHOD THEREOF

(71) Applicant: Mitsubishi Hitachi Power Systems, Ltd., Kanagawa (JP)

(72) Inventors: Masakazu Nose, Yokohama (JP); Hideyuki Uechi, Tokyo (JP); Satoshi Tanimura, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 294 days.

(21) Appl. No.: 16/337,073

(22) PCT Filed: Oct. 23, 2017

(86) PCT No.: PCT/JP2017/038183
§ 371 (c)(1),
(2) Date: Mar. 27, 2019

(87) PCT Pub. No.: WO2018/088184
PCT Pub. Date: May 17, 2018

(65) Prior Publication Data
US 2020/0032676 A1 Jan. 30, 2020

(30) Foreign Application Priority Data
Nov. 8, 2016 (JP) .............................. JP2016-218042

(51) Int. Cl.
*F02C 3/20* (2006.01)
*F02C 6/18* (2006.01)
(Continued)

(52) U.S. Cl.
CPC ................ *F02C 9/26* (2013.01); *F01K 23/10* (2013.01); *F02C 3/20* (2013.01); *F02C 3/22* (2013.01);
(Continued)

(58) Field of Classification Search
CPC .... F01K 23/10; F02C 3/20; F02C 3/22; F02C 3/28; F02C 9/40; F23R 3/36; Y02E 20/16
See application file for complete search history.

(56) References Cited

U.S. PATENT DOCUMENTS

| | | | |
|---|---|---|---|
| 2011/0176988 A1 | 7/2011 | Okamura et al. | |
| 2014/0047821 A1* | 2/2014 | Kawada | F01N 3/2066 60/299 |

(Continued)

FOREIGN PATENT DOCUMENTS

| | | |
|---|---|---|
| JP | 2948351 | 9/1999 |
| WO | 2010/032790 | 3/2010 |

OTHER PUBLICATIONS

International Search Report dated Nov. 21, 2017 in International (PCT) Application No. PCT/JP2017/038183, with English translation.

(Continued)

*Primary Examiner* — William H Rodriguez
(74) *Attorney, Agent, or Firm* — Wenderoth, Lind & Ponack, L.L.P.

(57) ABSTRACT

A gas turbine plant is provided with a gas turbine, a heating device, a decomposition gas line, and a decomposition gas compressor. The heating device heats ammonia and thermally decomposes the ammonia to convert the ammonia into decomposition gas including hydrogen gas and nitrogen gas. The decomposition gas line sends the decomposition gas PG from the heating device to the gas turbine. The decomposition gas compressor increases the pressure of the decom- (Continued)

position gas to a pressure equal to or higher than a feed pressure at which the decomposition gas is allowed to be fed to the gas turbine.

19 Claims, 14 Drawing Sheets

(51) Int. Cl.
    *F02C 9/26*         (2006.01)
    *F01K 23/10*       (2006.01)
    *F02C 3/22*         (2006.01)
    *F02C 7/22*         (2006.01)
    *F02C 9/40*         (2006.01)

(52) U.S. Cl.
    CPC .................. *F02C 6/18* (2013.01); *F02C 7/22* (2013.01); *F02C 9/40* (2013.01)

(56) References Cited

U.S. PATENT DOCUMENTS

2017/0260060 A1*  9/2017  Panza ..................... C01B 3/025
2018/0355794 A1* 12/2018  Bulat ..................... F02C 6/003

OTHER PUBLICATIONS

Written Opinion of the International Searching Authority dated Nov. 21, 2017 in International (PCT) Application No. PCT/JP2017/038183, with English translation.

\* cited by examiner

GAS TURBINE PLANT HAVING THERMAL DECOMPOSITION OF AMMONIA AND PRESSURIZATION OF THE DECOMPOSED GAS AND METHOD THEREOF

TECHNICAL FIELD

The present invention relates to a gas turbine plant that includes a gas turbine to be driven by combusting fuel and uses ammonia as at least a part of the fuel, and to an operating method for the gas turbine plant.

Priority is claimed on Japanese Patent Application No. 2016-218042, filed on Nov. 8, 2016, the content of which is incorporated herein by reference.

BACKGROUND ART

The plant disclosed in PTL 1 to be described below is one example of gas turbine plants. This plant includes a gas turbine, a booster pump that increases the pressure of liquid ammonia stored in an ammonia tank up to a pressure at which the liquid ammonia is allowed to be fed to the gas turbine, and an ammonia decomposition device that decomposes the liquid ammonia of which the pressure has been increased by the booster pump into hydrogen gas and nitrogen gas. The ammonia decomposition device exchanges heat between the liquid ammonia of which the pressure has been increased by the booster pump and exhaust gas which has been exhausted from the gas turbine, to heat the liquid ammonia and decompose the liquid ammonia into hydrogen gas and nitrogen gas.

CITATION LIST

Patent Literature

[PTL 1] Japanese Patent No. 2948351

SUMMARY OF INVENTION

Technical Problem

A reduction in the NOx concentration of the exhaust gas exhausted from the gas turbine plant is desired in the gas turbine plant.

Accordingly, an object of the invention is to provide a gas turbine plant that can reduce NOx concentration even though ammonia is used as at least a part of fuel, and an operating method for the gas turbine plant.

Solution to Problem

A gas turbine plant according to an aspect of the invention for achieving the object includes: a gas turbine that combusts fuel, is driven by combustion gas generated through combustion of the fuel, and exhausts the combustion gas as exhaust gas; a heating device that heats ammonia and thermally decomposes the ammonia to convert the ammonia into decomposition gas including hydrogen gas and nitrogen gas; a decomposition gas line that sends the decomposition gas flowing out of the heating device to the gas turbine; and a decomposition gas compressor that is provided on the decomposition gas line and increases a pressure of the decomposition gas flowing out of the heating device to a pressure equal to or higher than a feed pressure at which the decomposition gas is allowed to be fed to the gas turbine.

In this gas turbine plant, low-pressure ammonia having a pressure lower than the feed pressure is thermally decomposed by the heating device, and the pressure of decomposition gas generated through the thermal decomposition is then increased up to a pressure equal to or higher than the feed pressure by the decomposition gas compressor. For this reason, the thermal decomposition of ammonia in the heating device is facilitated in the gas turbine plant, so that the amount of residual ammonia gas included in the decomposition gas can be reduced. Accordingly, the amount of NOx included in the combustion gas generated through the combustion of the decomposition gas can be reduced in the gas turbine plant.

Here, the gas turbine plant may further include a cooler that is provided on the decomposition gas line at a position closer to the heating device than the decomposition gas compressor is and cools the decomposition gas flowing out of the heating device.

Since the decomposition gas flowing out of the heating device is immediately cooled by the cooler in this gas turbine plant, the generation of ammonia gas caused by the recombination of hydrogen gas and nitrogen gas included in the decomposition gas can be suppressed.

Further, in any one of the above-described gas turbine plants, the cooler may have capability for cooling the decomposition gas to a temperature of 100° C. or less.

Since the decomposition gas can be cooled to a temperature of 100° C. or less by the cooler in this gas turbine plant, the generation of ammonia gas caused by the recombination of hydrogen gas and nitrogen gas included in the decomposition gas can be further suppressed.

Any one of the above-described gas turbine plants may further include a boost cooler that cools the decomposition gas of which the pressure is being increased by the decomposition gas compressor.

Since the decomposition gas of which the pressure is being increased is cooled by the boost cooler in this gas turbine plant, the boost efficiency of the decomposition gas compressor can be improved. For this reason, energy required to drive the decomposition gas compressor can be reduced in the gas turbine plant. Further, since the temperature rise of the decomposition gas is suppressed, the recombination of hydrogen gas and nitrogen gas included in the decomposition gas can be suppressed.

In the gas turbine plant including the boost cooler, the decomposition gas compressor may include a plurality of partial boosters that are connected in series and sequentially increase the pressure of the decomposition gas, and the boost cooler may be disposed between two partial boosters which are adjacent to each other among the plurality of partial boosters.

In any one of the above-described gas turbine plants, the heating device may have capability for heating the ammonia up to a temperature of 500° C. or more.

Since ammonia is heated up to a temperature of 500° C. or more in this gas turbine plant, the concentration of residual ammonia gas included in the decomposition gas can be reduced.

In any one of the above-described gas turbine plants, the heating device may include a reactor that heats and thermally decomposes ammonia gas to generate the decomposition gas.

In the gas turbine plant including the reactor, the reactor may include a catalyst that comes in contact with the ammonia gas and facilitates the thermal decomposition of the ammonia gas.

In any one of the above-described gas turbine plants including the reactor, the heating device may include an evaporator that heats and vaporizes liquid ammonia to convert the liquid ammonia into the ammonia gas.

In the gas turbine plant including the evaporator, the heating device may include a preheater that heats the liquid ammonia not yet heated by the evaporator.

In any one of the above-described gas turbine plants, a pressure of the ammonia present in the heating device may be lower than the feed pressure and may be 0.3 MPa or more.

Since ammonia having a pressure not lower than 0.3 MPa that is the pressure required for the transport of liquid ammonia is made to flow as is into the heating device in this gas turbine plant, a pressure reducer of the gas turbine plant to be described later is not necessary. Further, since the pressure of the decomposition gas flowing out of the heating device in this gas turbine plant is higher than that in the gas turbine plant to be described later including a pressure reducer, a decomposition gas compressor which has boosting capacity lower than that of a decomposition gas compressor of the gas turbine plant to be described later is enough. Accordingly, this gas turbine plant is more advantageous than the gas turbine plant to be described later in terms of equipment cost. Furthermore, since the decomposition gas compressor of this gas turbine plant has only to increase the pressure of gas which is higher than that of the gas turbine plant to be described later, up to the same feed pressure as that of the gas turbine plant to be described later, energy required to drive the decomposition gas compressor is smaller than that of the gas turbine plant to be described later. Accordingly, this gas turbine plant is more advantageous than the gas turbine plant to be described later in terms of power generation efficiency.

Any one of the above-described gas turbine plants may further include a pressure reducer that reduces a pressure of the ammonia and then sends the ammonia to the heating device.

Since the pressure in the heating device is reduced in this gas turbine plant, the concentration of residual gas ammonia included in the decomposition gas generated in the heating device can be reduced. Accordingly, the amount of NOx included in the combustion gas generated through the combustion of the decomposition gas can be reduced in the gas turbine plant.

In the gas turbine plant including the pressure reducer, the pressure reducer may have capability for reducing the pressure of the ammonia to a pressure lower than 0.3 MPa.

In a case where liquid ammonia passes through the pressure reducer under a normal temperature environment in this gas turbine plant, the liquid ammonia can be vaporized and converted into gas ammonia due to a reduction in the pressure of ammonia. For this reason, an evaporator for vaporizing liquid ammonia can be omitted.

Any one of the above-described gas turbine plants including the pressure reducer may further include a preheater that exchanges heat between the ammonia of which the pressure has been reduced by the pressure reducer and an external medium to heat the ammonia and then sends the ammonia to the heating device as ammonia gas.

Any one of the above-described gas turbine plants may further include a natural gas line that sends natural gas to the gas turbine as at least a part of the fuel, and an adjuster that adjusts a ratio of a flow rate of the decomposition gas to a flow rate of all fuel gas including the natural gas and the decomposition gas supplied to the gas turbine.

In this gas turbine plant, the concentration of NOx included in the exhaust gas of the gas turbine can be adjusted by the adjustment of the ratio of the flow rate of the decomposition gas to the flow rate of all fuel gas.

The gas turbine plant including the adjuster may further include a control device that instructs the adjuster of a value relating to the ratio of the flow rate of the decomposition gas to the flow rate of the all fuel gas that is a value predetermined according to a pressure of the ammonia present in the heating device.

In the gas turbine plant including the control device, the predetermined value relating to the ratio of the flow rate of the decomposition gas to the flow rate of the all fuel gas may be reduced as the pressure of the ammonia present in the heating device increases.

The concentration of residual ammonia gas included in the decomposition gas increases as the pressure of the ammonia present in the heating device increases. For this reason, the amount of NOx included in the combustion gas generated through the combustion of the decomposition gas increases as the pressure of ammonia present in the heating device increases. Accordingly, as in this gas turbine plant, the amount of NOx included in the combustion gas can be reduced in a case where a predetermined value relating to the ratio of the flow rate of the decomposition gas to the flow rate of all fuel gas is reduced as the pressure of ammonia present in the heating device increases.

In any one of the above-described gas turbine plants, the heating device may use the heat of the exhaust gas exhausted from the gas turbine as a heat source for heating the ammonia.

Any one of the above-described gas turbine plants may further include an exhaust gas line through which the exhaust gas exhausted from the gas turbine flows, and the heating device may include a heat exchanger that is provided on the exhaust gas line and exchanges heat between the exhaust gas as a heat medium and the ammonia to heat the ammonia.

The gas turbine plant including the exhaust gas line may further include a boiler that is provided on the exhaust gas line and exchanges heat between water and the exhaust gas to heat the water and convert the water to steam; the exhaust gas line may include a first exhaust gas line and a second exhaust gas line; the boiler may be provided on the first exhaust gas line; and the heat exchanger may be provided on the second exhaust gas line.

In addition, an existing general gas turbine plant including a gas turbine and a boiler can be easily modified into this gas turbine plant. Further, even in a case where the temperature of the exhaust gas does not reach a temperature required for the decomposition of ammonia at the time of start of the gas turbine, or the like, the heat of the exhaust gas can be effectively used in the heat recovery steam generator in this gas turbine plant.

The gas turbine plant including the first exhaust gas line and the second exhaust gas line may further include a switcher that changes a flow of the exhaust gas between a first state where the exhaust gas flows through only the first exhaust gas line of the first and second exhaust gas lines and a second state where the exhaust gas flows through at least the second exhaust gas line.

The gas turbine plant including the switcher may further include: a thermometer that measures the temperature of the exhaust gas having not yet flowed into the heating device; and a control device that instructs an ammonia supply source which supplies the ammonia to the heating device to supply the ammonia and instructs the switcher to switch to the second state from the first state, on condition at least that the temperature measured by the thermometer is higher than a temperature at which the ammonia can be thermally decomposed in the heating device.

After the temperature of the exhaust gas reaches a temperature equal to or higher than a predetermined temperature, the exhaust gas starts to flow into the heating device and ammonia starts to be supplied to the heating device from the ammonia supply source in this gas turbine plant. For this reason, ammonia is heated up to a high temperature from the start of the supply of ammonia to the heat exchanger from the ammonia supply source in the gas turbine plant, so that decomposition gas including a small amount of residual ammonia gas can be generated. Accordingly, in the gas turbine plant, the amount of NOx included in the combustion gas generated through the combustion of the decomposition gas can be reduced from the start of the supply of ammonia to the heat exchanger from the ammonia supply source.

In any one of the above-described gas turbine plants, the heating device may include a heat exchanger that exchanges heat between a heat medium and the ammonia to heat the ammonia. The gas turbine plant may further include: a thermometer that measures the temperature of the heat medium having not yet flowed into the heat exchanger; and a control device that instructs an ammonia supply source which supplies the ammonia to the heat exchanger to supply the ammonia, on condition at least that the temperature measured by the thermometer is higher than a temperature at which the ammonia can be thermally decomposed in the heat exchanger.

An operating method for a gas turbine plant according to an aspect of the invention for achieving the object is an operating method for a gas turbine plant including a gas turbine that combusts fuel, is driven by combustion gas generated through combustion of the fuel, and exhausts the combustion gas as exhaust gas. The operating method includes: a heating step of heating ammonia and thermally decomposing the ammonia to convert the ammonia into decomposition gas including hydrogen gas and nitrogen gas; a boosting step of increasing a pressure of the decomposition gas to a pressure equal to or higher than a feed pressure at which the decomposition gas is allowed to be fed to the gas turbine; and a decomposition gas supply step of supplying the decomposition gas of which the pressure has been increased in the boosting step to the gas turbine as at least a part of the fuel.

Here, the operating method for a gas turbine plant may further include a cooling step of cooling the decomposition gas of which the pressure is not yet increased in the boosting step and increasing the pressure of the cooled decomposition gas in the boosting step.

Further, in any one of the above-described operating methods for a gas turbine plant, the decomposition gas may be cooled to a temperature of 100° C. or less in the cooling step.

Furthermore, any one of the above-described operating methods for a gas turbine plant may further include a boosting-cooling step of cooling the decomposition gas of which the pressure is being increased in the boosting step.

In any one of the above-described operating methods for a gas turbine plant, the ammonia may be heated up to a temperature of 500° C. or more in the heating step.

In any one of the above-described operating methods for a gas turbine plant, the heating step may include a reaction step of heating and thermally decomposing ammonia gas to generate the decomposition gas.

In the operating method for a gas turbine plant including the reaction step, the thermal decomposition of the ammonia gas may be facilitated by a catalyst in the reaction step.

In any one of the above-described operating methods for a gas turbine plant including the reaction step, the heating step may include an evaporation step of heating and vaporizing liquid ammonia to convert the liquid ammonia into the ammonia gas.

In the operating method for a gas turbine plant including the evaporation step, the heating step may include a preheating step of heating the liquid ammonia not yet heated in the evaporation step.

In any one of the above-described operating methods for a gas turbine plant, ammonia of which the pressure is lower than the feed pressure and is 0.3 MPa or more may be received in the heating step.

Any one of the above-described operating methods for a gas turbine plant may further include a pressure reducing step of reducing the pressure of the ammonia before the heating step.

In the operating method for a gas turbine plant including the pressure reducing step, the pressure of the ammonia may be reduced to a pressure lower than 0.3 MPa in the pressure reducing step.

Any one of the above-described operating methods for a gas turbine plant including the pressure reducing step may further include a preheating step of exchanging heat between the ammonia of which the pressure has been reduced in the pressure reducing step and an external medium to heat the ammonia before the heating step.

Any one of the above-described operating methods for a gas turbine plant may further include a natural gas supply step of supplying natural gas to the gas turbine as at least a part of the fuel, and an adjustment step of adjusting a ratio of a flow rate of the decomposition gas to a flow rate of all fuel gas including the natural gas and the decomposition gas supplied to the gas turbine.

In the operating method for a gas turbine plant including the adjustment step, the ratio of the flow rate of the decomposition gas to the flow rate of the all fuel gas may be set to a value predetermined according to the pressure of the ammonia which is being subjected to the heating step, in the adjustment step.

In the operating method for a gas turbine plant, the predetermined value relating to the ratio of the flow rate of the decomposition gas to the flow rate of the all fuel gas may be reduced as the pressure of the ammonia being subjected to the heating step increases.

In any one of the above-described operating methods for a gas turbine plant, the heat of the exhaust gas exhausted from the gas turbine may be used in the heating step as a heat source for heating the ammonia.

In any one of the above-described operating methods for a gas turbine plant, the heating step may include a heat exchange step of using the exhaust gas exhausted from the gas turbine as a heat medium and exchanging heat between the heat medium and the ammonia to heat the ammonia.

The operating method for a gas turbine plant which uses the exhaust gas as the heat medium may further include a steam generation step of exchanging heat between water and the exhaust gas exhausted from the gas turbine to heat the water and convert the water to steam, and a branching step of allowing the exhaust gas exhausted from the gas turbine to branch into first exhaust gas and second exhaust gas. Heat may be exchanged between the first exhaust gas and the water in the steam generation step, and heat may be exchanged between the second exhaust gas and the ammonia in the heat exchange step.

The operating method for a gas turbine plant including the branching step may further include a switching step of changing a flow of the exhaust gas between a first state where only the first exhaust gas of the first exhaust gas and the second exhaust gas flows and a second state where at least the second exhaust gas flows.

The operating method for a gas turbine plant including the switching step may further include: a temperature measurement step of measuring the temperature of the exhaust gas that is not yet subjected to heat exchange in the heat exchange step; and an ammonia supply step of allowing the ammonia supplied from an ammonia supply source to be subjected to the heat exchange step on condition at least that the temperature measured in the temperature measurement step is higher than a temperature at which the ammonia can be thermally decomposed in the heat exchange step. In the switching step, the first state may be switched to the second state on condition at least that the temperature measured in the temperature measurement step is higher than a temperature at which the ammonia can be thermally decomposed in the heat exchange step.

In any one of the above-described operating methods for a gas turbine plant, the heating step may include a heat exchange step of exchanging heat between a heat medium and the ammonia to heat the ammonia. The operating method may further include: a temperature measurement step of measuring the temperature of the heat medium that is not yet subjected to heat exchange in the heat exchange step; and an ammonia supply step of allowing the ammonia supplied from an ammonia supply source to be subjected to the heat exchange step on condition at least that the temperature measured in the temperature measurement step is higher than a temperature at which the ammonia can be thermally decomposed in the heat exchange step.

Further, a gas turbine plant according to another aspect of the invention includes: a gas turbine that combusts fuel, is driven by combustion gas generated through combustion of the fuel, and exhausts the combustion gas as exhaust gas; a first exhaust gas line and a second exhaust gas line through which the exhaust gas exhausted from the gas turbine flows; a boiler that is provided on the first exhaust gas line and exchanges heat between water and the exhaust gas to heat the water and convert the water to steam; a heat exchanger that is provided on the second exhaust gas line and exchanges heat between ammonia and the exhaust gas to decompose the ammonia into decomposition gas including hydrogen gas and nitrogen gas with the heat of the heat medium; a decomposition gas line that sends the decomposition gas flowing out of the heat exchanger to the gas turbine as at least a part of the fuel; and a switcher that changes a flow of the exhaust gas between a first state where the exhaust gas flows through only the first exhaust gas line of the first and second exhaust gas lines and a second state where the exhaust gas flows through at least the second exhaust gas line.

In this gas turbine plant, the exhaust gas can be sent to the heat exchanger when a condition for thermally decomposing ammonia by the heat exchanger is satisfied. Further, an existing general gas turbine plant including a gas turbine and a heat recovery steam generator can be easily modified into this gas turbine plant. Furthermore, even in a case where the temperature of the exhaust gas does not reach a temperature required for the decomposition of ammonia at the time of start of the gas turbine, or the like, the heat of the exhaust gas can be effectively used in the heat recovery steam generator in the gas turbine plant.

Here, the gas turbine plant may further include: a thermometer that measures the temperature of the exhaust gas having not yet flowed into the heat exchanger; and a control device that instructs an ammonia supply source which supplies the ammonia to the heat exchanger to supply the ammonia and instructs the switcher to switch to the second state from the first state, on condition at least that the temperature measured by the thermometer is higher than a temperature at which the ammonia can be thermally decomposed in the heat exchanger.

After the temperature of the exhaust gas reaches a temperature equal to or higher than a predetermined temperature, the exhaust gas starts to flow into the heat exchanger and ammonia starts to be supplied to the heat exchanger from the ammonia supply source in this gas turbine plant. For this reason, ammonia is heated up to a high temperature from the start of the supply of ammonia to the heat exchanger from the ammonia supply source in the gas turbine plant, so that decomposition gas including a small amount of residual ammonia gas can be generated. Accordingly, in the gas turbine plant, the amount of NOx included in the combustion gas generated through the combustion of the decomposition gas can be reduced from the start of the supply of ammonia to the heat exchanger from the ammonia supply source.

Any one of the above-described gas turbine plants may further include a natural gas line that sends natural gas to the gas turbine as at least a part of the fuel.

The gas turbine plant including the natural gas line may further include an adjuster that adjusts a ratio of a flow rate of the decomposition gas to a flow rate of all fuel gas including the natural gas and the decomposition gas supplied to the gas turbine.

The gas turbine plant including the adjuster may further include a control device that instructs the adjuster of a value relating to the ratio of the flow rate of the decomposition gas to the flow rate of the all fuel gas that is a value predetermined according to a pressure of the ammonia present in the heat exchanger.

Further, an operating method for a gas turbine plant according to another aspect of the invention is an operating method for a gas turbine plant including a gas turbine that combusts fuel, is driven by combustion gas generated through combustion of the fuel, and exhausts the combustion gas as exhaust gas. The operating method includes: a branching step of allowing the exhaust gas exhausted from the gas turbine to branch into first exhaust gas and second exhaust gas; a steam generation step of exchanging heat between water and the first exhaust gas to heat the water and convert the water to steam; a heat exchange step of exchanging heat between ammonia and the second exhaust gas to decompose the ammonia into decomposition gas including hydrogen gas and nitrogen gas with the heat of the heat medium; a decomposition gas supply step of sending the decomposition gas to the gas turbine as at least a part of the fuel; and a switching step of changing a flow of the exhaust gas between a first state where only the first exhaust gas of the first exhaust gas and the second exhaust gas flows and a second state where at least the second exhaust gas flows.

Here, the operating method for a gas turbine plant may further include: a temperature measurement step of measuring the temperature of the exhaust gas that is not yet subjected to heat exchange in the heat exchange step; and an ammonia supply step of allowing the ammonia supplied from an ammonia supply source to be subjected to the heat exchange step on condition at least that the temperature measured in the temperature measurement step is higher than a temperature at which the ammonia can be thermally decomposed in the heat exchange step. In the switching step, the first state may be switched to the second state on condition at least that the temperature measured in the temperature measurement step is higher than a temperature at which the ammonia can be thermally decomposed in the heat exchange step.

Any one of the above-described operating methods for a gas turbine plant may further include a natural gas supply step of supplying natural gas to the gas turbine as at least a part of the fuel.

The operating method for a gas turbine plant including the natural gas supply step may further include an adjustment step of adjusting a ratio of a flow rate of the decomposition gas to a flow rate of all fuel gas including the natural gas and the decomposition gas supplied to the gas turbine.

In the operating method for a gas turbine plant including the adjustment step, the ratio of the flow rate of the decomposition gas to the flow rate of the all fuel gas may be set to a value predetermined according to the pressure of the ammonia which is being subjected to the heat exchange step, in the adjustment step.

In the operating method for a gas turbine plant, the predetermined value relating to the ratio of the flow rate of the decomposition gas to the flow rate of the all fuel gas may be reduced as the pressure of the ammonia being subjected to the heat exchange step increases.

Advantageous Effects of Invention

According to an aspect of the invention, NOx concentration can be reduced even though ammonia is used as at least a part of fuel.

DESCRIPTION OF EMBODIMENTS

Various embodiments and various modification examples of a gas turbine plant will be described below with reference to drawings.

First Embodiment

A first embodiment of a gas turbine plant will be described with reference to FIGS. 1 to 4.

Figure 1:
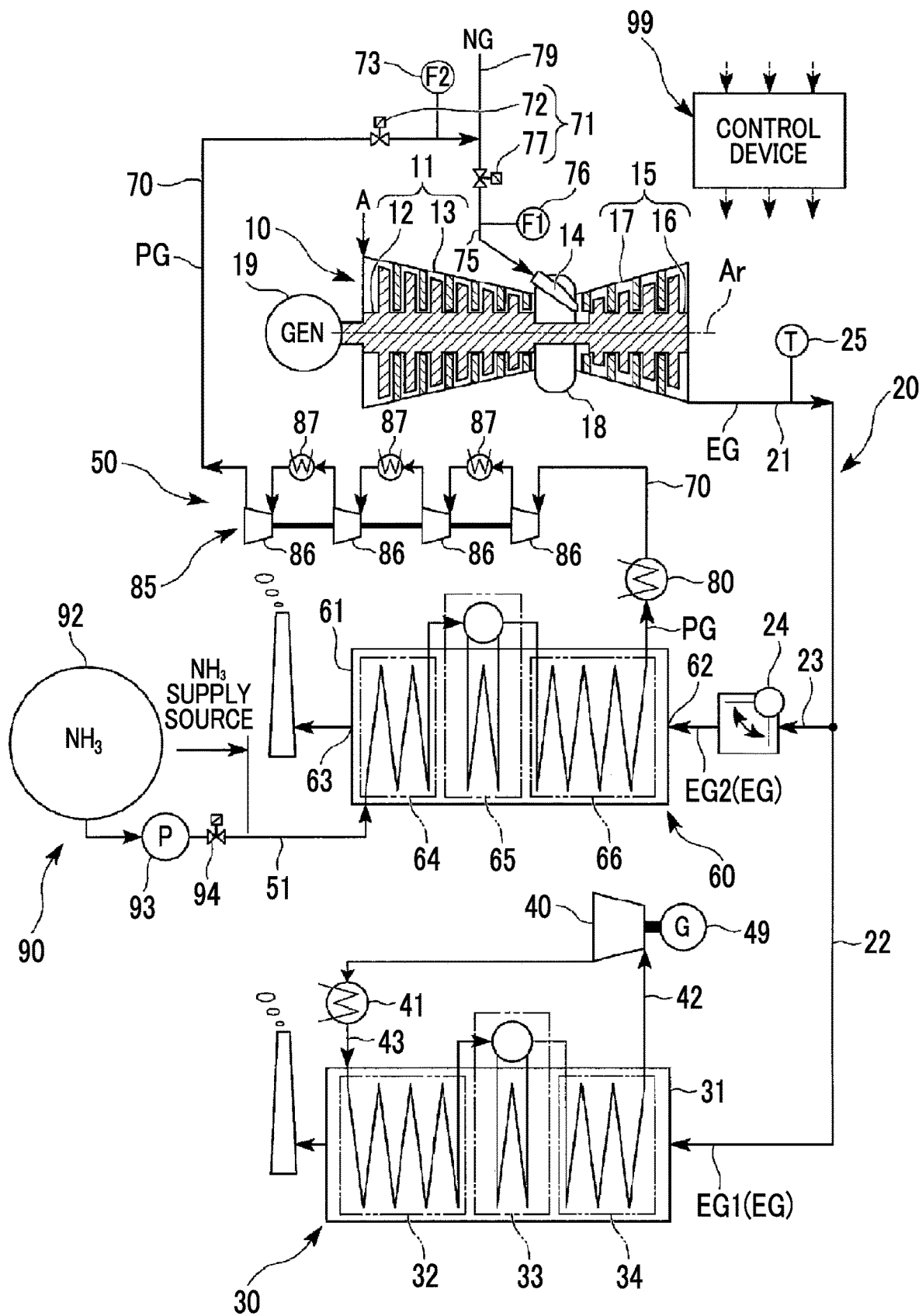
FIG. 1 is a system diagram of a gas turbine plant according to a first embodiment of the invention.

As shown in FIG. 1, the gas turbine plant of this embodiment includes a gas turbine 10, a generator 19 that generates electricity by the drive of the gas turbine 10, an exhaust gas line 20, a heat recovery steam generator 30, a steam turbine 40, a generator 49 that generates electricity by the drive of the steam turbine 40, a condenser 41, decomposition gas supply equipment 50 that decomposes ammonia to supply decomposition gas PG including hydrogen gas and nitrogen gas to the gas turbine 10, and a control device 99 that controls these components.

The gas turbine 10 includes an air compressor 11 that compresses air A, a combustor 14 that combusts fuel in the air compressed by the air compressor 11 to generate combustion gas, and a turbine 15 that is driven by the combustion gas having high temperature and high pressure. The air compressor 11 includes a compressor rotor 12 that is rotated about an axis Ar and a compressor casing 13 that covers the compressor rotor 12. The turbine 15 includes a turbine rotor 16 that is rotated about the axis Ar and a turbine casing 17 that covers the turbine rotor 16. The compressor rotor 12 and the turbine rotor 16 are positioned on the same axis Ar, are connected to each other, and form a gas turbine rotor. A rotor of the generator 19 is connected to the gas turbine rotor. The gas turbine 10 further includes an intermediate casing 18 that is positioned between the compressor casing 13 and the turbine casing 17 and connects the compressor casing 13 to the turbine casing 17. The combustor 14 is mounted on the intermediate casing 18. The compressor casing 13, the intermediate casing 18, and the turbine casing 17 are connected to each other, and form a gas turbine casing. A fuel line 75 is connected to the combustor 14. The fuel line 75 is provided with a fuel flow meter 76 that measures the flow rate of fuel flowing through the fuel line 75 and a fuel control valve 77 that controls the flow rate of fuel flowing through the fuel line 75. A natural gas line 79 through which natural gas NG as a part of fuel flows is connected to the fuel line 75.

Exhaust gas EG which is exhausted from the gas turbine 10 flows through the exhaust gas line 20. The exhaust gas line 20 includes a main exhaust gas line 21, a first exhaust gas line 22, and a second exhaust gas line 23. A first end of the main exhaust gas line 21 is connected to an exhaust port of the turbine 15. The first exhaust gas line 22 and the second exhaust gas line 23 are connected to a second end of the main exhaust gas line 21. That is, the exhaust gas line 20 branches into the first exhaust gas line 22 and the second exhaust gas line 23 at the second end of the main exhaust gas line 21.

The heat recovery steam generator 30 includes an outer boiler frame 31 through which the exhaust gas EG flows, an economizer 32, an evaporator 33, and a superheater 34. The outer boiler frame 31 is connected to the first exhaust gas line 22. Accordingly, first exhaust gas EG1 having flowed through the first exhaust gas line 22 flows into the outer boiler frame 31. For this reason, it can also be said that the outer boiler frame 31 forms a part of the first exhaust gas line 22. The economizer 32 is disposed in the outer boiler frame 31, and exchanges heat between water and the exhaust gas EG to heat the water. A part of the evaporator is disposed in the outer boiler frame 31, and the evaporator 33 exchanges heat between the water which has been heated by the economizer 32 and the exhaust gas EG to heat the water and convert the water into steam. The superheater 34 is disposed in the outer boiler frame 31, and exchanges heat between the steam and the exhaust gas EG to superheat the steam.

The steam turbine 40 is driven by the steam that is generated by the heat recovery steam generator 30. For this purpose, a steam inlet of the steam turbine 40 and the superheater 34 of the heat recovery steam generator 30 are connected to each other through a steam line 42. The generator 49 is connected to the steam turbine 40. The condenser 41 is connected to a steam exhaust port of the steam turbine 40. The condenser 41 converts the steam which has been exhausted from the steam turbine 40 back into water. The water which has been generated by the condenser 41 is returned to the heat recovery steam generator 30. For this purpose, the condenser 41 and the economizer 32 of the heat recovery steam generator 30 are connected to each other through a water supply line 43.

The heat recovery steam generator 30 is drawn in FIG. 1 as a boiler that generates steam having only one kind of pressure, but the heat recovery steam generator 30 may be a boiler that generates plural kinds of steam having pressures different from one another. In this case, a steam turbine may be provided for each of the plural kinds of steam.

The decomposition gas supply equipment 50 includes an ammonia line 51, a heat exchanger 60 as a heating device, a decomposition gas line 70, a cooler 80, a decomposition gas compressor 85, the main exhaust gas line 21, the second exhaust gas line 23, a switcher 24, and a thermometer 25.

Liquid ammonia which is supplied from an ammonia supply source 90 flows through the ammonia line 51, and the ammonia line 51 sends the liquid ammonia to the heat exchanger 60. For example, the ammonia supply source 90 includes an ammonia tank 92 in which the liquid ammonia is stored, an ammonia pump 93 that pumps the liquid ammonia stored in the ammonia tank 92 to the decomposition gas supply equipment 50, and an ammonia shut-off valve 94 that is provided on the discharge side of the ammonia pump 93.

The heat exchanger 60 as a heating device exchanges heat between the ammonia and the exhaust gas EG to decompose the ammonia into decomposition gas PG including hydrogen gas and nitrogen gas with the heat of the exhaust gas EG. The heat exchanger 60 includes a heat exchanger frame 61 through which the exhaust gas EG flows, a preheater 64, an evaporator 65, and a reactor 66. The heat exchanger frame is connected to the second exhaust gas line 23.

Accordingly, second exhaust gas EG2 having flowed through the second exhaust gas line 23 flows into the heat exchanger frame 61. For this reason, it can also be said that the heat exchanger frame 61 forms a part of the second exhaust gas line 23. The preheater 64 is connected to the ammonia line 51. The preheater 64 is disposed in the heat exchanger frame 61, and exchanges heat between the liquid ammonia which has been sent from the ammonia line 51 and the exhaust gas EG to heat the liquid ammonia. A part of the evaporator is disposed in the heat exchanger frame 61, and the evaporator 65 exchanges heat between the liquid ammonia which has been heated by the preheater 64 and the exhaust gas EG to further heat the liquid ammonia and vaporize the liquid ammonia into ammonia gas. The reactor 66 is disposed in the heat exchanger frame 61, exchanges heat between the ammonia gas and the exhaust gas EG, and decomposes the ammonia gas into decomposition gas PG including hydrogen gas and nitrogen gas with the heat of the exhaust gas EG. The heat exchanger frame 61 is provided with an exhaust gas inlet 62 and an exhaust gas outlet 63. The preheater 64, the evaporator 65, and the reactor 66 are arranged in the heat exchanger frame 61 in this order toward the exhaust gas inlet 62 from the exhaust gas outlet 63.

Figure 2:
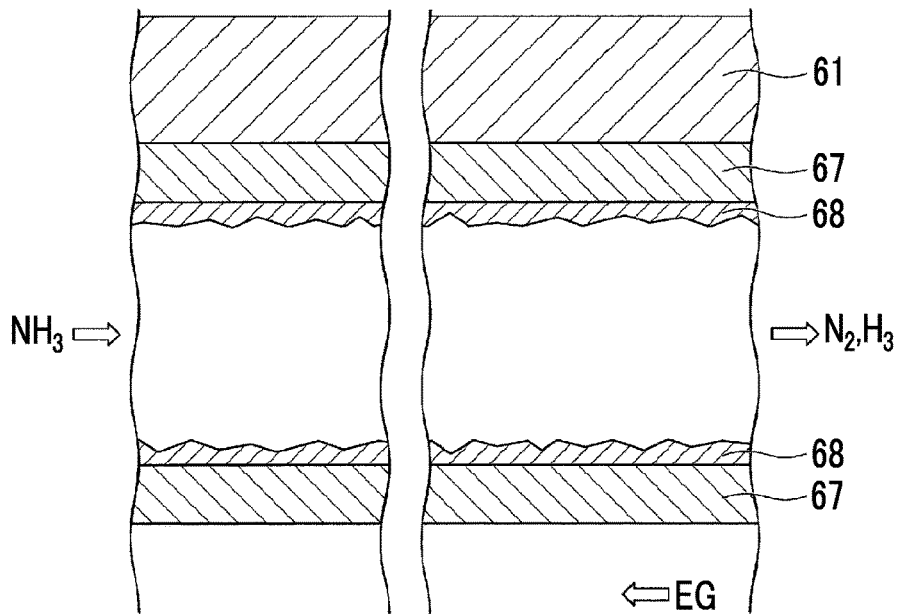
FIG. 2 is a partial cross-sectional view of a reactor of the first embodiment of the invention.

As shown in FIG. 2, the reactor 66 includes a flow channel-forming member 67 that forms a flow channel through which ammonia gas and the decomposition gas PG flow in the heat exchanger frame 61 through which the exhaust gas EG flows, and a catalyst 68 that is provided in the flow channel formed by the flow channel-forming member 67. The flow channel-forming member 67 is formed of, for example, a heat transfer pipe or a combination of a plurality of plates. For example, Co-CeZrOx, 4 wt % Cs/Co-CeZrOx, 1 wt % K/Co-CeZrOx, 10 wt % Ba/Co-CeZrOx, $Cs_2O$/Ru/Mg—Al, and the like are used as the catalyst 68. Each of these catalysts is a catalyst of which the conversion ratio of the conversion of ammonia gas into hydrogen gas and nitrogen gas is high at a temperature of 450° C. to 700° C.

A first end of the decomposition gas line 70 is connected to the reactor 66. A second end of the decomposition gas line 70 is connected to the fuel line 75. Accordingly, natural gas NG that has flowed into the fuel line 75 from the natural gas line 79 and the decomposition gas PG that has flowed into the fuel line 75 from the decomposition gas line 70 can be supplied to the combustor 14 as fuel.

The cooler 80 is provided on the decomposition gas line 70. The cooler 80 is, for example, a heat exchanger and exchanges heat between a refrigerant and the decomposition gas PG to cool the decomposition gas PG.

The decomposition gas compressor 85 is provided on the decomposition gas line 70 at a position closer to the combustor than the cooler 80 is. The decomposition gas compressor 85 increases the pressure of the decomposition gas PG which has been cooled by the cooler 80, to a feed pressure at which the decomposition gas PG is allowed to be fed to the combustor 14. The decomposition gas compressor 85 of this embodiment includes a plurality of partial boosters 86 that are connected in series and sequentially increase the pressure of the decomposition gas PG. Rotors of the plurality of partial boosters 86 are connected to each other and are integrally rotated as the rotor of the decomposition gas compressor. A boost cooler 87 is provided between two partial boosters 86 which are adjacent to each other among the plurality of partial boosters 86. The boost cooler 87 functions to increase boost efficiency at the downstream partial booster 86 of the two partial boosters 86 adjacent to each other, by cooling the decomposition gas PG of which the pressure has been increased by the upstream partial booster 86 and reducing the volume of the decomposition gas PG. In addition, the boost coolers 87 also function to suppress the recombination of hydrogen gas and nitrogen gas included in the decomposition gas PG by suppressing the temperature rise of the decomposition gas PG. The boost coolers 87 are not essential and may be omitted. Further, the rotors of the plurality of partial boosters 86 of this embodiment are connected to each other, but the respective rotors of the plurality of partial boosters 86 may be independent of each other. Furthermore, the decomposition gas compressor 85 of this embodiment includes the plurality of partial boosters 86, but the decomposition gas compressor 85 may be formed of only one booster as long as the decomposition gas compressor 85 can increase the pressure of the decomposition gas PG to a pressure equal to or higher than the feed pressure.

A decomposition gas flow meter 73 that measures the flow rate of the decomposition gas PG flowing through the decomposition gas line 70 and a decomposition gas control valve 72 that adjusts the flow rate of the decomposition gas PG flowing through the decomposition gas line 70 are further provided on the decomposition gas line 70 at positions closer to the combustor than the decomposition gas compressor 85 is.

Here, the feed pressure which is the pressure of the decomposition gas PG at which the decomposition gas PG is allowed to be fed to the combustor 14, is, for example, 5 MPa. For this reason, the decomposition gas compressor 85 receives decomposition gas PG of which the pressure is lower than 5 MPa as the feed pressure, and increases the pressure of the decomposition gas PG to 5 MPa or more. Further, the ammonia pump 93 increases the pressure of the liquid ammonia which has been sent from the ammonia tank 92, and sends this liquid ammonia to the heat exchanger 60. It is preferable to increase the pressure of liquid ammonia to at least 0.3 MPa or more by the ammonia pump 93 to send ammonia to the heat exchanger 60. For this purpose, the discharge pressure of the ammonia pump 93 is 0.3 MPa or more and lower than the feed pressure (for example, 5 MPa). Here, the discharge pressure of the ammonia pump 93 is, for example, 1 MPa. Accordingly, the pressure of ammonia present in the heat exchanger 60 is 0.3 MPa or more and lower than the feed pressure (for example, 5 MPa), and is, for example, 1 MPa. The pressure of ammonia present in the heat exchanger 60, that is, the pressure of ammonia received by the heat exchanger 60 is 0.3 MPa or more in this embodiment, but is more preferably 1 MPa or more. In a case where the pressure of ammonia received by the heat exchanger 60 is 1 MPa or more, it is possible to suppress the vaporization of liquid ammonia into gas ammonia while liquid ammonia supplied from the ammonia supply source 90 is sent to the heat exchanger 60. For this reason, it is possible to easily supply ammonia to the heat exchanger 60 from the ammonia supply source 90 in a case where the pressure of ammonia received by the heat exchanger 60 is 1 MPa or more.

The switcher 24 is provided on the second exhaust gas line 23. The switcher 24 changes the flow of the exhaust gas EG between a first state where the exhaust gas EG (first exhaust gas EG1) flows through only the first exhaust gas line 22 and a second state where the exhaust gas EG (second exhaust gas EG2) flows through at least the second exhaust gas line 23. In the second state of this embodiment, the exhaust gas EG flows not only through the second exhaust gas line 23 but also through the first exhaust gas line 22. For example, the switcher 24 includes a damper valve that is provided on the second exhaust gas line 23 and a valve actuator that drives the damper valve. For example, the switcher 24 may be provided at the position of the second end of the main exhaust gas line 21, that is, at a position where the first exhaust gas line 22 and the second exhaust gas line 23 branch from the main exhaust gas line 21. The thermometer 25 is provided on the main exhaust gas line 21, and measures the temperature of the exhaust gas EG that flows through the main exhaust gas line 21.

The control device 99 controls the switcher 24, the fuel control valve 77, the decomposition gas control valve 72, and the like according to various commands that are input from the outside, or the temperature that is measured by the thermometer 25 provided on the main exhaust gas line 21, the flow rate that is measured by the fuel flow meter 76 provided on the fuel line 75, the flow rate that is measured by the decomposition gas flow meter 73 provided on the decomposition gas line 70, and the like. In this embodiment, an adjuster 71 for adjusting a ratio of the flow rate of the decomposition gas PG to the flow rate of all fuel gas which includes the natural gas NG and the decomposition gas PG supplied to the gas turbine 10, includes the fuel control valve 77 and the decomposition gas control valve 72.

Figure 4:
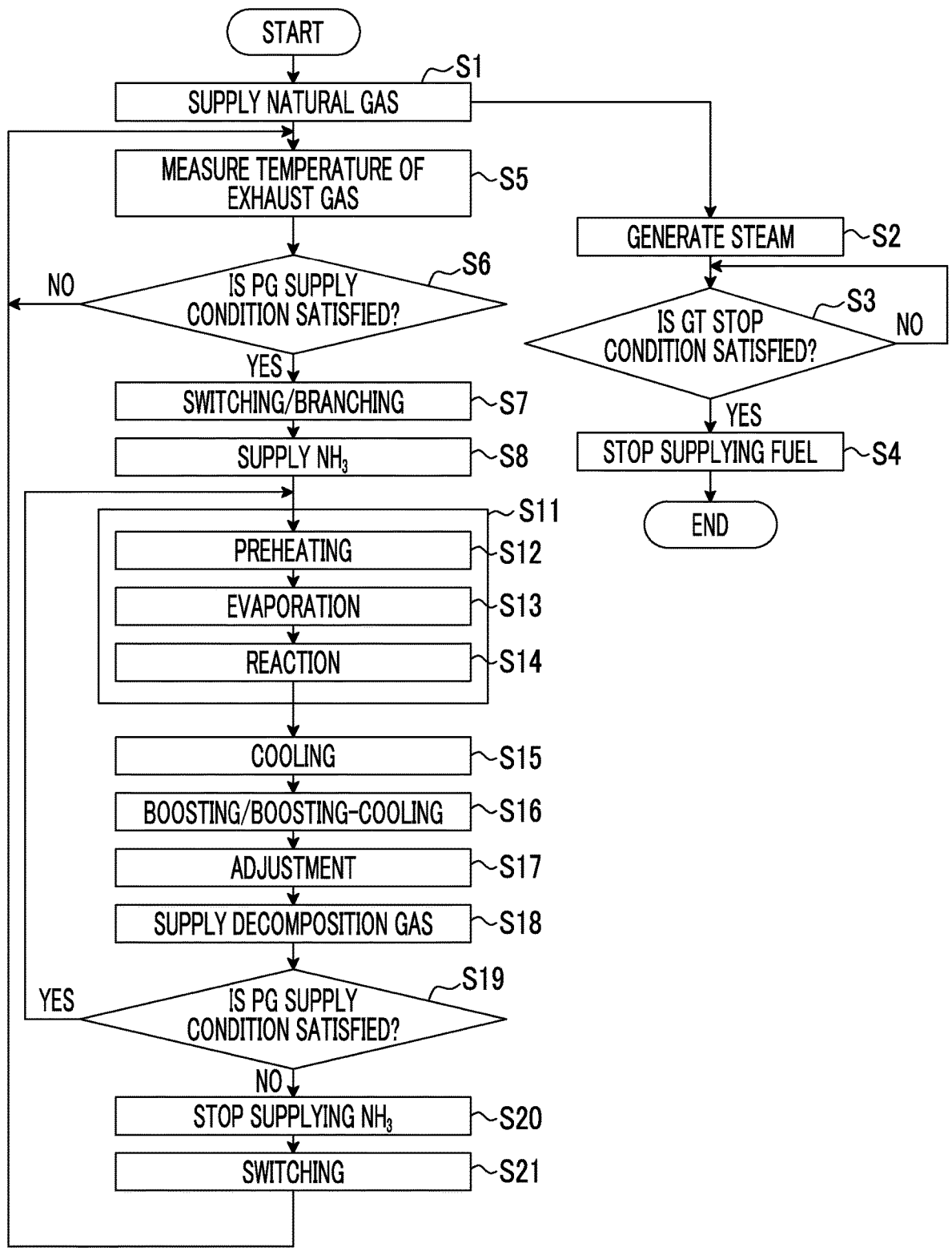
FIG. 4 is a flowchart showing the operation of the gas turbine plant according to the first embodiment of the invention.

Next, the operation of the gas turbine plant of this embodiment will be described with reference to a flowchart shown in FIG. 4.

Before the start of the gas turbine 10, the decomposition gas control valve 72 and the ammonia shut-off valve 94 are in a closed state. Further, the switcher 24 is in the first state where the exhaust gas EG (first exhaust gas EG1) flows through only the first exhaust gas line 22. At the time of start of the gas turbine 10, only the natural gas NG of fuel of the gas turbine 10 is supplied to the combustor 14. For this purpose, the decomposition gas control valve 72 is closed as described above at the time of start of the gas turbine 10. In a case where the gas turbine 10 is to be started, first, the control device 99 obtains the calorific value of fuel at which an output corresponding to a load represented by a load command input from the outside can be obtained. Then, the control device 99 determines the opening degree of the fuel control valve 77 corresponding to the flow rate of the natural gas NG at which the calorific value of fuel can be met, and instructs the fuel control valve 77 of this opening degree. As a result, the natural gas NG is supplied to the combustor 14 of the gas turbine 10 through the natural gas line 79 and the fuel line 75 (S1: natural gas supply step).

Air which has been compressed by the air compressor 11 flows into the combustor 14. In the combustor 14, fuel is combusted in the compressed air and combustion gas having high temperature and high pressure is generated. The combustion gas is sent into the turbine casing 17, and rotates the turbine rotor 16. As the turbine rotor 16 is rotated, the generator 19 connected to the gas turbine 10 generates electricity.

The combustion gas which has rotated the turbine rotor 16 is exhausted from the gas turbine 10 as the exhaust gas EG and flows into the heat recovery steam generator 30 through the main exhaust gas line 21 and the first exhaust gas line 22. The heat recovery steam generator 30 converts water into steam with the heat of the exhaust gas EG while the exhaust gas EG passes through the heat recovery steam generator 30 (S2: steam generation step). Specifically, heat is exchanged between water and the exhaust gas EG in the economizer 32 of the heat recovery steam generator 30, so that this water is heated. This water is further heated by the exhaust gas EG in the evaporator 33 of the heat recovery steam generator 30, and is converted into steam. This steam is further superheated by the exhaust gas EG in the superheater 34 of the heat recovery steam generator 30, and is converted into superheated steam. This superheated steam is sent to the steam turbine 40 through the steam line 42, and drives the steam turbine 40. As a result, the generator 49 connected to the steam turbine 40 generates electricity. Steam exhausted from the steam turbine 40 is cooled by the condenser 41, and is converted into water. This water is returned to the economizer 32 of the heat recovery steam generator 30 through the water supply line 43.

After the start of the gas turbine 10, the control device 99 determines whether or not a stop condition of the gas turbine 10 is satisfied (S3: GT stop condition determination step). The stop condition of the gas turbine 10 includes, for example, that a load represented by a load command input from the outside is 0, that an emergency stop command or the like is received from the gas turbine 10, and the like. If the control device 99 determines that the stop condition is not satisfied, the control device 99 repeats the determination of whether or not the stop condition is satisfied until the stop condition is satisfied. Meanwhile, fuel is supplied to the gas turbine 10 and the heat recovery steam generator 30 continues to generate steam. If the control device 99 determines that the stop condition is satisfied, the control device 99 stops the supply of fuel to the combustor 14 (S4: fuel supply stopping step). In the fuel supply stopping step (S4), the control device 99 outputs an instruction to the fuel control valve 77 to be closed. As a result, the fuel control valve 77 reaches a closed state, and the supply of fuel to the combustor 14 is stopped.

After the start of the gas turbine 10, the thermometer 25 measures the temperature of the exhaust gas EG that flows through the main exhaust gas line 21 (S5: exhaust gas temperature measurement step). The control device 99 determines whether or not a supply condition of the decomposition gas PG is satisfied (S6: PG supply condition determination step). The supply condition of the decomposition gas PG includes that the ammonia supply source 90 is in a state of being able to supply ammonia to the decomposition gas supply equipment 50, that the temperature of the exhaust gas EG is equal to or higher than a predetermined temperature, and the like. The state of the ammonia supply source 90 being able to supply ammonia to the decomposition gas supply equipment 50 is, for example, a state where the amount of ammonia stored in the ammonia tank 92 is equal to or larger than a predetermined amount. The control device 99 receives a state signal output from a control device for the ammonia supply source 90 as to whether or not the ammonia supply source 90 is in the state of being able to supply ammonia, and makes the determination according to the contents represented by the state signal. Further, the control device 99 determines whether or not the temperature of the exhaust gas EG is equal to or higher than a predetermined temperature on the basis of the temperature that is measured by the thermometer 25. The flow rate of the natural gas NG supplied to the combustor 14 gradually increases while the gas turbine 10 is started. For this reason, the flow rate of the exhaust gas EG exhausted from the gas turbine 10 gradually increases and the temperature of the exhaust gas EG gradually rises. When the gas turbine 10 reaches a steady operating state, the temperature of the exhaust gas EG is, for example, 650° C. or more in this embodiment. The temperature of 650° C. which is the lowest temperature of the exhaust gas EG exhausted from the gas turbine 10 having reached the steady operating state is used as the predetermined temperature in this embodiment. This temperature is a temperature that is higher than a temperature at which ammonia can be thermally decomposed in the heat exchanger 60. When the ammonia supply source 90 is in the state of being able to supply ammonia and the temperature measured by the thermometer 25 is equal to or higher than the predetermined temperature (for example, 650° C.), the control device 99 determines that the supply condition of the decomposition gas PG is satisfied.

If the control device 99 determines that the supply condition of the decomposition gas PG is satisfied, the control device 99 instructs the switcher 24 to be in the second state. As a result, the switcher 24 is switched to the second state from the first state, and the exhaust gas EG exhausted from the gas turbine 10 branches so that the exhaust gas EG (second exhaust gas EG2) flows through the second exhaust gas line 23 while a state where the exhaust gas EG (first exhaust gas EG1) flows through the first exhaust gas line 22 is maintained (S7: switching/branching step). After the control device 99 outputs an instruction to the switcher 24 to switch the state, the control device 99 instructs the ammonia supply source 90 to supply ammonia. Specifically, the control device 99 instructs the ammonia shut-off valve 94 to be opened and instructs the ammonia pump 93 to be driven. These instructions are sent to the ammonia pump 93 and the ammonia shut-off valve 94 from the control device 99 of the gas turbine plant through the control device for the ammonia supply source 90. As a result, ammonia supplied from the ammonia supply source 90 starts to be supplied to the heat exchanger 60 (S8: ammonia supply step).

After ammonia is supplied to the heat exchanger 60, the ammonia starts to be heated by heat exchange between the ammonia and the exhaust gas EG having a temperature of 650° C. or more (S11: heating step (heat exchange step)). In the heating step (S11), first, the preheater 64 exchanges heat between liquid ammonia which has been supplied from the ammonia supply source 90 and the exhaust gas EG to heat the liquid ammonia (S12: preheating step). For example, the temperature of the liquid ammonia which has been supplied from the ammonia supply source 90 is 15° C. and the pressure of the liquid ammonia is 1 MPa. The liquid ammonia having a pressure of 1 MPa evaporates at a temperature of 25° C. In the preheating step (S12), the liquid ammonia having a temperature of 15° C. is heated and converted into liquid ammonia having a temperature of about 25° C. Then, the evaporator 65 exchanges heat between the liquid ammonia having a temperature of about 25° C. and the exhaust gas EG to heat and vaporize the liquid ammonia and convert the liquid ammonia into ammonia gas having a temperature of 25° C. (S13: evaporation step). After that, the reactor 66 exchanges heat between the ammonia gas having a temperature of 25° C. and the exhaust gas EG to heat and thermally decompose the ammonia gas, decompose the ammonia gas into hydrogen gas and nitrogen gas, and convert the ammonia gas into decomposition gas PG having a temperature of about 600° C. (S14: reaction step). In the reaction step (S14), the thermal decomposition of the ammonia gas is facilitated by the catalyst 68 provided in the reactor 66.

The thermal decomposition reaction of ammonia gas will be briefly described here. As shown by the following formula, the thermal decomposition of ammonia accelerates with a temperature rise and the ammonia decomposes into hydrogen gas and nitrogen gas. On the other hand, the thermal decomposition of ammonia is suppressed with an increase in pressure.

$$NH_3 \Leftrightarrow 3/2H_2 + 1/2N_2$$

Accordingly, it is preferable for the decomposition of ammonia gas that ammonia be heated up to a high temperature under low pressure.

Figure 3:
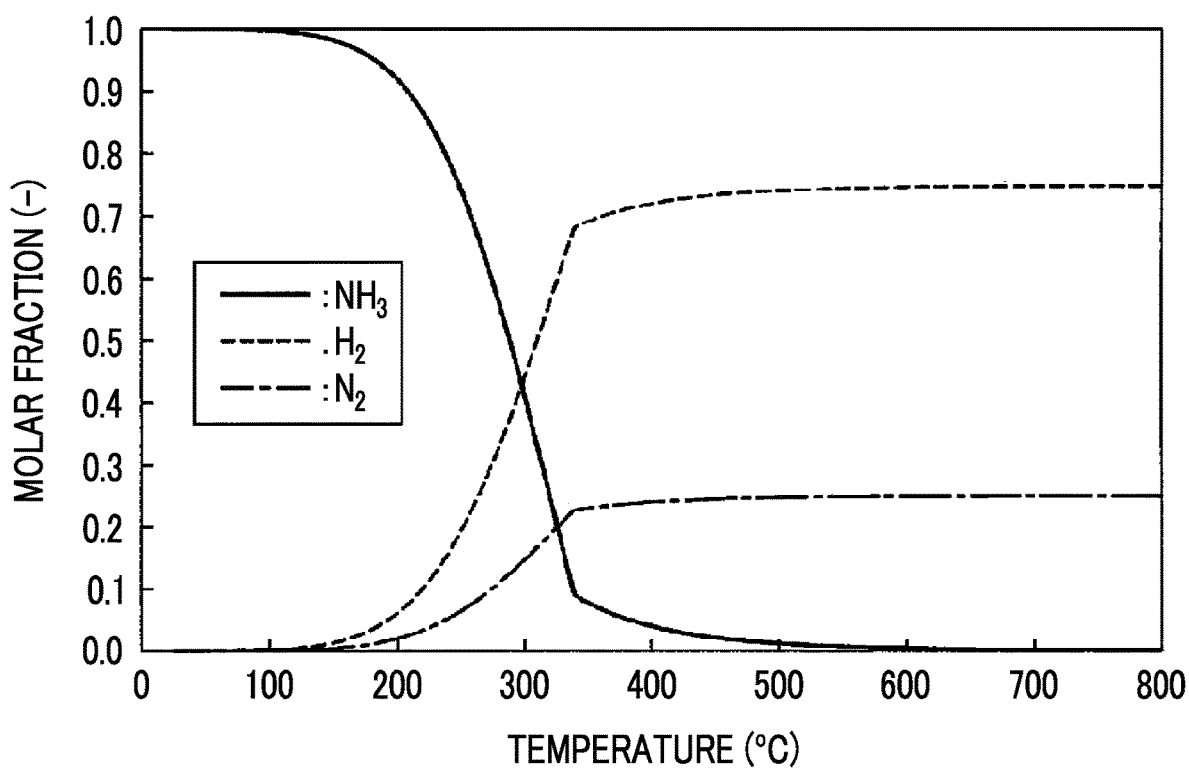
FIG. 3 is a graph showing a relationship between a temperature and molar fractions of ammonia gas, hydrogen gas, and nitrogen gas under an environment of 1 MPa.

The molar fractions of ammonia gas, hydrogen gas, and nitrogen gas which are obtained under an environment where (cesium oxide+ruthenium) catalyst (for example, $Cs_2O/Ru/Mg$—Al having been described above) is used as the catalyst 68 at a pressure of 1 MPa, are shown in FIG. 3. Thus, after the temperature exceeds about 100° C., the ammonia gas starts to decompose and the molar fraction of the ammonia gas gradually reduces. On the other hand, the molar fractions of the hydrogen gas and the nitrogen gas gradually increase conversely. Accordingly, it is necessary to heat the ammonia gas to a temperature higher than 100° C. to increase the kinetic energy of the ammonia gas to be equal to or larger than active energy under this environment. After the temperature exceeds about 200° C., the molar fraction of the ammonia gas rapidly reduces. After the temperature exceeds 400° C., the molar fraction of the ammonia gas reaches 0.05 or less. Then, after the temperature reaches 600° C., the molar fraction of the ammonia gas reaches substantially 0. Since the temperature of gas flowing out of the reactor 66 is set to 600° C. in this embodiment, the molar fraction of the ammonia gas reaches substantially 0 and most of the ammonia gas becomes hydrogen gas and nitrogen gas. Here, even in a case where the temperature of gas flowing out of the reactor 66 is 600° C., ammonia gas remains slightly in the gas flowing out of the reactor 66. Specifically, 0.49 mol % of ammonia gas remains. Accordingly, hydrogen gas, nitrogen gas, and a slight amount of ammonia gas are included in the gas flowing out of the reactor 66, that is, the decomposition gas PG.

The heating step (S11) ends with the reaction step (S14). The decomposition gas PG which has a temperature of 600° C. and has flowed in from the heat exchanger 60 is cooled by the cooler 80 (S15: cooling step). In the cooling step (S15), heat is exchanged between the decomposition gas PG having a temperature of 600° C. and a refrigerant and the decomposition gas PG is cooled to a temperature lower than 100° C. Specifically, the decomposition gas PG having a temperature of 600° C. is converted into decomposition gas PG having a temperature of, for example, 40° C. by the cooler 80. Since the decomposition gas PG is cooled to a temperature lower than 100° C. as described above, the generation of ammonia gas caused by the recombination of hydrogen gas and nitrogen gas included in the decomposition gas PG can be suppressed.

The decomposition gas PG which has been cooled by the cooler 80 is cooled by the boost coolers 87 while the pressure of the decomposition gas PG is increased to a pressure equal to or higher than the feed pressure (for example, 5 MPa) by the plurality of partial boosters 86 of the decomposition gas compressor 85 (S16: boosting/boosting-cooling step). Since the decomposition gas PG of which the pressure is being increased is cooled by the boost coolers 87 as described above, the boost efficiency of the plurality of boosters can be improved. Accordingly, energy required to drive the plurality of partial boosters 86 can be reduced. In addition, since the temperature rise of the decomposition gas PG is suppressed, the recombination of hydrogen gas and nitrogen gas included in the decomposition gas PG can be suppressed.

After the flow rate of the decomposition gas PG of which the pressure has been increased by the decomposition gas compressor 85 is adjusted by the decomposition gas control valve 72, the decomposition gas PG flows into the fuel line 75. The natural gas NG which has been supplied from the natural gas line 79 also flows into the fuel line 75. The flow rate of the decomposition gas PG and the natural gas NG which have flowed into the fuel line 75 is adjusted by the fuel control valve 77. Accordingly, the ratio of the flow rate of the decomposition gas PG to the flow rate of all fuel gas which includes the natural gas NG and the decomposition gas PG is adjusted by the adjuster 71 that includes the decomposition gas control valve 72 and the fuel control valve 77 (S17: flow ratio adjustment step).

A predetermined value relating to the ratio of the flow rate of the decomposition gas PG to the flow rate of all fuel gas is stored in the control device 99. The predetermined value is a value determined so that, for example, NOx concentration in the exhaust gas EG is less than an environmental standard. NOx concentration in the exhaust gas EG exhausted from the gas turbine 10 increases with an increase in the amount of residual ammonia gas included in the decomposition gas PG. As described above, the decomposition of ammonia gas is suppressed and the amount of the residual ammonia gas increases as pressure under a decomposition reaction environment increases. For this reason, the above-mentioned predetermined value is reduced to reduce the NOx concentration in the exhaust gas EG as pressure under a decomposition reaction environment, that is, pressure in the heat exchanger 60 increases.

As described above, the control device 99 obtains the calorific value of fuel at which an output corresponding to a load represented by a load command can be obtained. The control device 99 obtains the flow rate of all fuel gas and the flow rate of the decomposition gas which are to be obtained when the above-mentioned ratio of the flow rate is set to the predetermined value, on the basis of this calorific value of fuel. Then, the control device 99 determines the opening degree of the decomposition gas control valve 72 corresponding to the flow rate of the decomposition gas, and instructs the decomposition gas control valve 72 of this opening degree. In addition, the control device 99 obtains the opening degree of the fuel control valve 77 corresponding to the flow rate of all fuel gas, and instructs the fuel control valve 77 of this opening degree.

As described above, the decomposition gas PG and the natural gas NG which have flowed into the fuel line 75 are supplied to the combustor 14 after passing through the fuel control valve 77 (S18: decomposition gas supply step). In the combustor 14, the decomposition gas PG and the natural gas NG as fuel are combusted in the air that has been compressed by the air compressor 11. As a result, combustion gas having high temperature and high pressure is generated. This combustion gas is sent into the turbine casing 17, and is exhausted from the gas turbine 10 after rotating the turbine rotor 16. A part of the exhaust gas EG which has been exhausted from the gas turbine 10 is used to heat water in the heat recovery steam generator 30 as the first exhaust gas EG1. Further, the second exhaust gas EG2 which is the rest of the exhaust gas EG is used to heat ammonia in the heat exchanger 60.

After the control device 99 instructs the decomposition gas control valve 72 of the valve opening degree and instructs the fuel control valve 77 of the valve opening degree, the control device 99 determines whether or not the supply condition of the decomposition gas PG is satisfied (S19: PG supply condition determination step). If the supply condition of the decomposition gas PG is satisfied, the steps from the heating step (S11) to the PG supply condition determination step (S19) having been described above are repeatedly performed. On the other hand, if the control device 99 determines that the supply condition of the decomposition gas PG is not satisfied in the PG supply condition determination step (S19), the control device 99 instructs the ammonia supply source 90 to stop supplying ammonia. Specifically, the control device 99 instructs the ammonia pump 93 to stop and instructs the ammonia shut-off valve 94 to be closed. As a result, the supply of ammonia to the heat exchanger 60 from the ammonia supply source 90 is stopped (S20: ammonia supply stopping step).

After the control device 99 instructs the ammonia supply source 90 to stop supplying ammonia, the control device 99 instructs the switcher 24 to return to the first state from the second state (S21: switching step). As a result, the exhaust gas EG exhausted from the gas turbine 10 does not flow through the second exhaust gas line 23 and flows through only the first exhaust gas line 22. For this reason, the first exhaust gas EG1 is supplied to the heat recovery steam generator 30 from the first exhaust gas line 22 even after the supply condition of the decomposition gas PG is no longer satisfied, and steam continues to be generated by the heat recovery steam generator 30.

After the switching step (S21) is performed, processing returns to the temperature measurement step (S5) again. Then, if the temperature measured in the temperature measurement step (S5) satisfies the supply condition of the decomposition gas PG, the supply of ammonia from the ammonia supply source 90 is started (S8) and the supply of the decomposition gas PG to the combustor 14 is started (S18) as described above.

If the control device 99 determines that the stop condition of the gas turbine 10 is satisfied (S3), the control device 99 outputs an instruction to the fuel control valve 77 to be closed, and stops the supply of fuel to the combustor 14 (S4) as described above. Since the flow rate of fuel supplied to the combustor 14 gradually reduces in the fuel supply stopping step (S4), the temperature of the exhaust gas EG gradually lowers. For this reason, before the flow rate of fuel supplied to the combustor 14 reaches 0, the supply condition of the decomposition gas PG stops to be satisfied and the supply of ammonia from the ammonia supply source 90 is stopped (S20).

As described above, in this embodiment, low-pressure ammonia having a pressure lower than the feed pressure is received and is thermally decomposed by the heat exchanger 60, and the pressure of decomposition gas PG generated through the thermal decomposition is then increased up to a pressure equal to or higher than the feed pressure by the decomposition gas compressor 85. For this reason, the thermal decomposition of ammonia in the heat exchanger 60 is facilitated, so that the amount of the residual ammonia gas included in the decomposition gas PG can be reduced. Moreover, since the decomposition gas PG flowing out of the heat exchanger 60 is immediately cooled by the cooler 80 not including a catalyst, the generation of ammonia gas caused by the recombination of hydrogen gas and nitrogen gas included in the decomposition gas PG can be suppressed. Accordingly, the amount of NOx included in the combustion gas generated through the combustion of the decomposition gas PG can be reduced in this embodiment.

In addition, since the amount of NOx included in the combustion gas generated through the combustion of the decomposition gas PG can be reduced in this embodiment, the ratio of the flow rate of the decomposition gas PG to the flow rate of all fuel can be increased.

The gas turbine plant of this embodiment is a plant where the decomposition gas supply equipment 50 is added to a general gas turbine plant including the gas turbine 10 and the heat recovery steam generator 30. For this reason, in this embodiment, an existing general gas turbine plant can be easily modified into the gas turbine plant. Further, even in a case where the temperature of the exhaust gas EG does not reach a temperature required for the decomposition of ammonia at the time of start of the gas turbine 10, or the like, the heat of the exhaust gas EG can be effectively used in the heat recovery steam generator 30 in the gas turbine plant of this embodiment.

Furthermore, after the temperature of the exhaust gas EG reaches a temperature equal to or higher than a predetermined temperature, the exhaust gas EG starts to flow into the heat exchanger 60 (S7) and ammonia starts to be supplied to the heat exchanger 60 from the ammonia supply source 90 (S8) in this embodiment. For this reason, ammonia is heated up to a high temperature from the start of the supply of ammonia to the heat exchanger 60 from the ammonia supply source 90 in this embodiment, so that decomposition gas PG including a small amount of residual ammonia gas can be generated. Accordingly, in this embodiment, the amount of NOx included in the combustion gas generated through the combustion of the decomposition gas PG can be reduced from the start of the supply of ammonia to the heat exchanger 60 from the ammonia supply source 90.

Second Embodiment

A second embodiment of a gas turbine plant will be described with reference to FIGS. 5 to 7.

Figure 5:
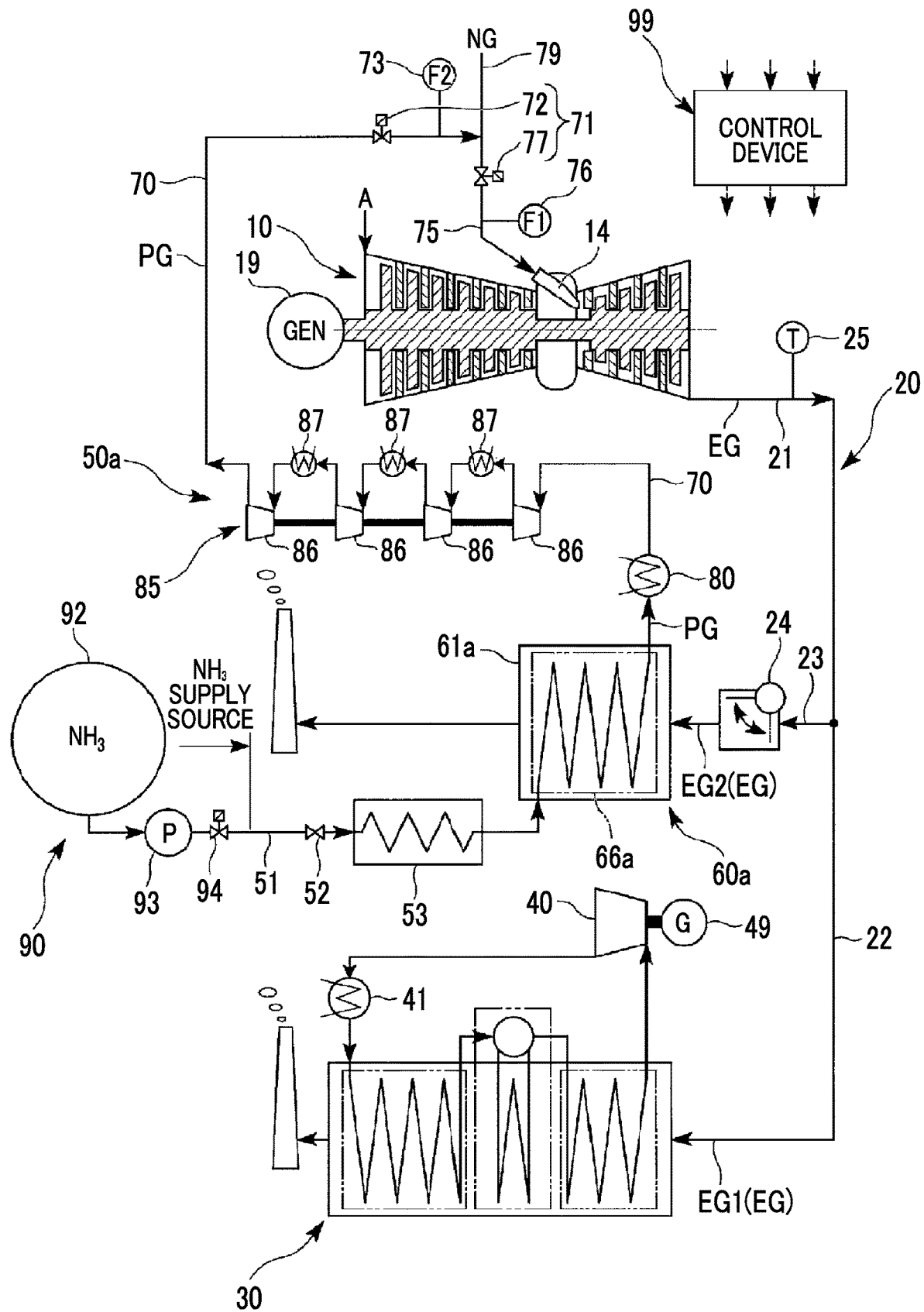
FIG. 5 is a system diagram of a gas turbine plant according to a second embodiment of the invention.

As shown in FIG. 5, the gas turbine plant of this embodiment includes a pressure reducer 52 and a preheater 53 instead of the preheater 64 and the evaporator 65 of the gas turbine plant of the first embodiment. Both the pressure reducer 52 and the preheater 53 are components of decomposition gas supply equipment 50a of this embodiment.

The pressure reducer 52 is provided on the ammonia line 51 that extends from the ammonia supply source 90. The pressure reducer 52 reduces the pressure of liquid ammonia which flows through the ammonia line 51 to a pressure lower than 0.3 MPa. Liquid ammonia having a pressure of 0.3 MPa is vaporized at a temperature of about 0° C. and is converted into ammonia gas. For this reason, when an environment where the pressure reducer 52 is disposed is higher than 0° C., the liquid ammonia can be vaporized and converted into ammonia gas while passing through the pressure reducer 52, before the liquid ammonia is heated by a heat exchanger 60a. The discharge pressure of the ammonia pump 93 of this embodiment is, for example, 1 MPa as exemplified in the first embodiment. The pressure reducer 52 of this embodiment reduces the pressure of the liquid ammonia which has been sent from the ammonia pump 93, to, for example, 0.1 MPa, that is, about atmospheric pressure. Liquid ammonia having a pressure of 0.1 MPa is vaporized at a temperature of about −30° C. and is converted into ammonia gas. Basically, the pressure reducer 52 is disposed under an environment higher than −30° C. For this reason, the liquid ammonia can be almost reliably vaporized and converted into ammonia gas while passing through the pressure reducer 52, before the liquid ammonia is heated by the heat exchanger 60 exchanger 60a.

The preheater 53 is provided on the ammonia line 51 at a position closer to the heat exchanger 60a than the pressure reducer 52 is. The preheater 53 uses river water, seawater, atmospheric air, or the like as an external medium, and exchanges heat between the external medium and ammonia to heat the ammonia. While the ammonia passes through the preheater 53, the ammonia is heated up to a temperature in the range of about 15° C. to 25° C., depending on the temperature of the external medium, and the like. Accordingly, even if the pressure of liquid ammonia is reduced to about 0.3 MPa (here, a pressure lower than 0.3 MPa) by the pressure reducer 52, the liquid ammonia can be almost reliably converted into ammonia gas while passing through the preheater 53.

As described above, in this embodiment, liquid ammonia is almost reliably converted into ammonia gas before the liquid ammonia flows into the heat exchanger 60*a* as a heating device. For this purpose, the heat exchanger 60*a* of this embodiment includes a reactor 66*a* and a heat exchanger frame 61*a* and does not include the preheater 64 and the evaporator 65 of the heat exchanger 60 of the first embodiment. The reactor 66*a* includes a catalyst that facilitates the thermal decomposition of ammonia gas as with the reactor 66 of the first embodiment. The reactor 66*a* heats and thermally decomposes ammonia gas which has a temperature in the range of about 15° C. to 25° C., with the heat of the exhaust gas EG, decomposes the ammonia gas into hydrogen gas and nitrogen gas, and converts the ammonia gas into decomposition gas PG having a temperature of about 600° C. as in the first embodiment.

As described above, the heat exchanger 60*a* of this embodiment does not include the preheater 64 and the evaporator 65 and includes only the reactor 66*a*. On the other hand, the heat exchanger 60 of the first embodiment includes the preheater 64, the evaporator 65, and the reactor 66. The temperature of ammonia flowing into the heat exchanger 60*a* of this embodiment and the temperature of ammonia flowing into the heat exchanger 60 of the first embodiment are substantially equal to each other. Further, the temperature of decomposition gas PG flowing out of the heat exchanger 60*a* of this embodiment and the temperature of decomposition gas PG flowing out of the heat exchanger 60 of the first embodiment are equal to each other. For this reason, the heat-transfer area of the heat exchanger 60*a* of this embodiment and the heat-transfer area of the heat exchanger 60 of the first embodiment are substantially equal to each other.

The decomposition gas PG flowing out of the heat exchanger 60*a* is guided to the combustor 14 through the decomposition gas line 70 and the fuel line 75 as in the first embodiment. The decomposition gas PG is cooled by the cooler 80 while passing through the decomposition gas line 70 as in the first embodiment. After that, the pressure of the decomposition gas PG is increased to a pressure equal to or higher than the feed pressure (for example, 5 MPa) by the decomposition gas compressor 85. Then, after the ratio of the flow rate of the decomposition gas PG to the flow rate of all fuel gas is adjusted by the decomposition gas control valve 72 and the fuel control valve 77, the decomposition gas PG is supplied to the combustor 14.

The configuration of a gas turbine 10, an exhaust gas line 20, a heat recovery steam generator 30, a steam turbine 40, a condenser 41, and the like of this embodiment is the same as that of the first embodiment.

Figure 6:
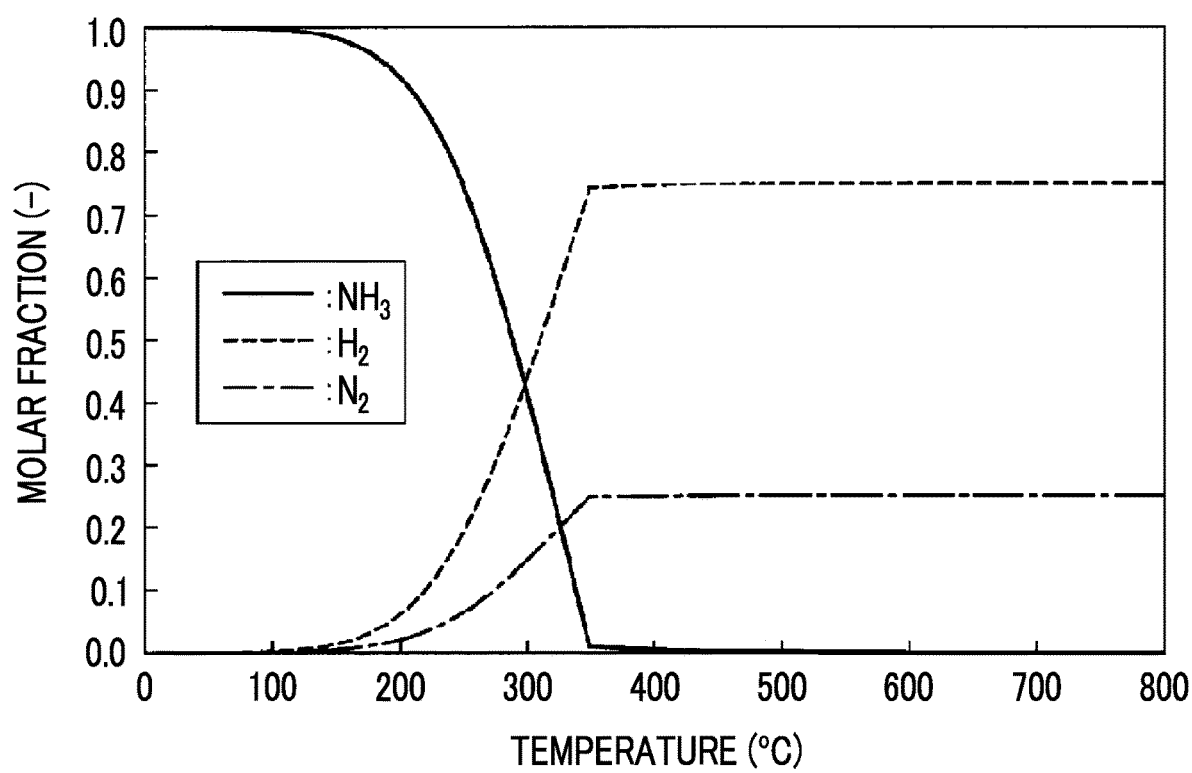
FIG. 6 is a graph showing a relationship between a temperature and molar fractions of ammonia gas, hydrogen gas, and nitrogen gas under an environment of 0.1 MPa.
Figure 7:
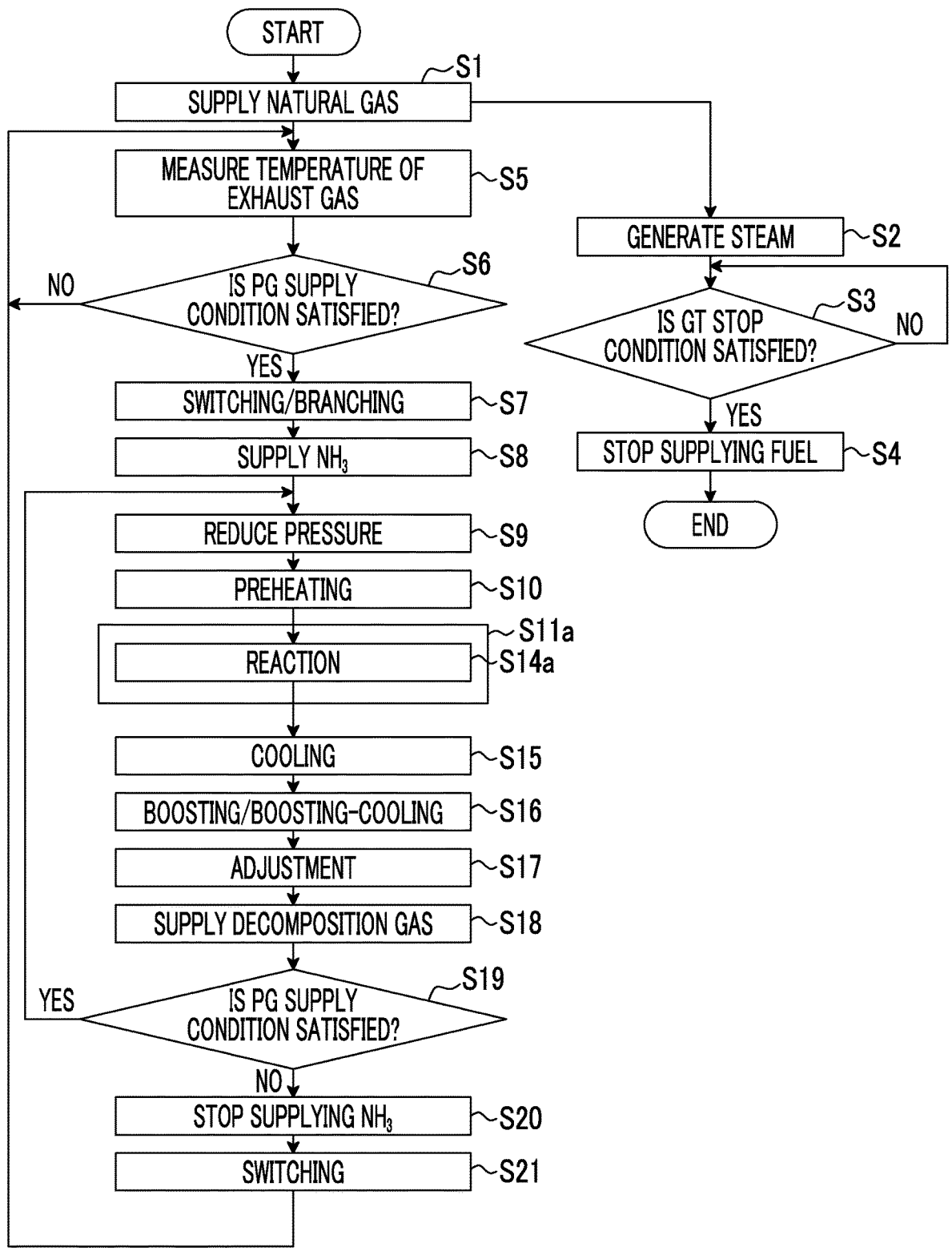
FIG. 7 is a flowchart showing the operation of the gas turbine plant according to the second embodiment of the invention.

The molar fractions of ammonia gas, hydrogen gas, and nitrogen gas which are obtained under an environment where (cesium oxide+ruthenium) catalyst (for example, $Cs_2O/Ru/Mg$—Al having been described above) is used as the catalyst at a pressure of 0.1 MPa, are shown in FIG. 6. Thus, after the temperature exceeds about 100° C., the ammonia gas starts to decompose and the molar fraction of the ammonia gas gradually reduces as in the case of 1 MPa. On the other hand, the molar fractions of the hydrogen gas and the nitrogen gas gradually increase conversely. After the temperature exceeds about 200° C., the molar fraction of the ammonia gas rapidly reduces. After the temperature exceeds 350° C., the molar fraction of the ammonia gas reaches 0.01 or less. Then, after the temperature reaches 600° C., the molar fraction of the ammonia gas reaches substantially 0. Since the temperature of gas flowing out of the reactor 66*a* is set to 600° C. also in this embodiment, the molar fraction of the ammonia gas reaches substantially 0 and most of the ammonia gas becomes hydrogen gas and nitrogen gas. Here, even in a case where the temperature of gas flowing out of the reactor 66*a* is 600° C., ammonia gas remains very slightly in the gas flowing out of the reactor 66*a*. Specifically, 0.05 mol % of ammonia gas remains. The concentration (0.05 mol %) of residual ammonia gas included in the decomposition gas PG in this embodiment is lower than the concentration (0.49 mol %) of the residual ammonia gas included in the decomposition gas PG in the first embodiment. The reason for this is that the pressure of ammonia gas under a decomposition reaction environment, that is, pressure in the heat exchanger 60*a* is lower than that of the first embodiment.

Next, the operation of the gas turbine plant of this embodiment will be briefly described with reference to a flowchart shown in FIG. 7.

S1 to S8 are also performed in the gas turbine plant of this embodiment as in the gas turbine plant of the first embodiment.

After the ammonia supply step (S8) is started, the pressure of liquid ammonia supplied from the ammonia supply source 90 is reduced by the pressure reducer 52 in this embodiment (S9: pressure reducing step). The ammonia of which the pressure has been reduced by the pressure reducer 52 is heated by the preheater 53 disposed outside the heat exchanger 60*a* (S10: preheating step).

In the preheating step (S10), as described above, the preheater 53 uses river water, seawater, atmospheric air, or the like as an external medium, and exchanges heat between the external medium and ammonia to heat the ammonia up to a temperature in the range of about 15° C. to 25° C. As a result, ammonia having passed through the preheater 53 is almost reliably converted into ammonia gas as described above.

The ammonia gas generated from the preheater 53 flows into the heat exchanger 60*a* as a heating device, and is heated by heat exchange with the exhaust gas EG in the heat exchanger 60*a* (S11*a*: heating step (heat exchange step)). In the heating step (S11*a*), the reactor 66*a* of the heat exchanger 60*a* exchanges heat between the ammonia gas and the exhaust gas EG to heat and thermally decompose the ammonia gas and convert the ammonia gas into decomposition gas PG (S14*a*: reaction step).

As in the first embodiment, the decomposition gas PG flowing out of the heat exchanger 60*a* is subjected to the cooling step (S15) performed in the cooler 80, an increase in pressure performed in the decomposition gas compressor 85, the boosting-cooling step (S16) performed by the boost coolers 87, and the adjustment step (S17) performed in the adjuster 71, and is supplied to the combustor 14 (S18).

Since the pressure in the heat exchanger 60*a* in this embodiment is lower than that in the first embodiment, the concentration of the residual gas ammonia included in the decomposition gas PG generated through the thermal decomposition of gas ammonia in the heat exchanger 60*a* in this embodiment is even lower than that in the first embodiment. For this reason, a predetermined value relating to the ratio of the flow rate of the decomposition gas PG to the flow rate of all fuel gas in the adjustment step (S17) of this embodiment, that is, the ratio stored in the control device 99 is larger than that of the first embodiment. Accordingly, the amount of the decomposition gas PG supplied to the combustor 14 in this embodiment is larger than that in the first embodiment.

Then, as in the first embodiment, the control device 99 determines whether or not the supply condition of the decomposition gas PG is satisfied (S19: PG supply condition determination step). If the supply condition of the decomposition gas PG is satisfied, the steps from the pressure reducing step (S9) to the PG supply condition determination step (S19) are repeatedly performed. On the other hand, if the control device 99 determines that the supply condition of the decomposition gas PG is not satisfied in the PG supply condition determination step (S19), the control device 99 instructs the ammonia supply source 90 to stop supplying ammonia as in the first embodiment. As a result, the supply of ammonia to the heat exchanger 60*a* from the ammonia supply source 90 is stopped (S20: ammonia supply stopping step).

After the control device 99 instructs the ammonia supply source 90 to stop supplying ammonia, the control device 99 instructs the switcher 24 to return to the first state from the second state as in the first embodiment (S21: switching step). As a result, the exhaust gas EG exhausted from the gas turbine 10 does not flow through the second exhaust gas line 23 and flows through only the first exhaust gas line 22. Then, processing returns to the temperature measurement step (S5).

Figure 9:
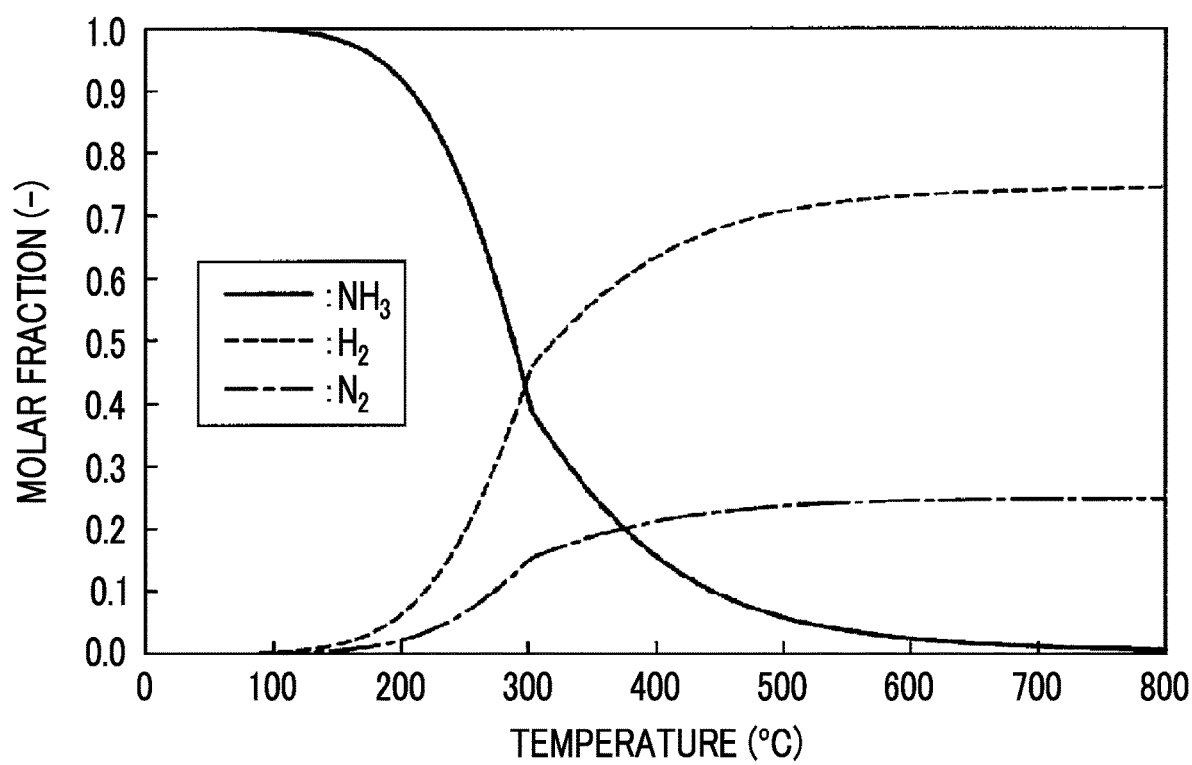
FIG. 9 is a graph showing a relationship between a temperature and molar fractions of ammonia gas, hydrogen gas, and nitrogen gas under an environment of 5 MPa.

As described above, also in this embodiment, as in the first embodiment, low-pressure ammonia having a pressure lower than the feed pressure is received and is thermally decomposed by the heat exchanger 60*a*, and the pressure of decomposition gas PG generated through the thermal decomposition is then increased up to a pressure equal to or higher than the feed pressure by the decomposition gas compressor 85. For this reason, the amount of NOx included in the combustion gas generated through the combustion of the decomposition gas PG can be reduced also in this embodiment, and the ratio of the flow rate of the decomposition gas PG to the flow rate of all fuel can be increased. In a case where low-pressure ammonia having a pressure lower than the feed pressure (for example, 5 MPa) is to be heated by the heat exchangers 60 and 60*a* in this embodiment and the first embodiment, the molar fraction of the residual ammonia gas can be reduced to lower than 0.1 if the low-pressure ammonia is heated up to a temperature of 500° C. or more by the heat exchangers 60 and 60*a*. For this reason, it is preferable that the low-pressure ammonia be heated up to a temperature of 500° C. or more in the heat exchangers 60 and 60*a*, and it is more preferable that the low-pressure ammonia be heated up to a temperature of 600° C. or more in the heat exchangers 60 and 60*a*. The molar fraction of the residual ammonia gas at the feed pressure (for example, 5 MPa) is shown in FIG. 9 to be used to describe a third embodiment.

Moreover, also in this embodiment, an existing general gas turbine plant can be easily changed into the gas turbine plant of this embodiment for the same reason as the reason described in the first embodiment.

Further, also in this embodiment, the amount of NOx included in the combustion gas generated through the combustion of the decomposition gas PG can be reduced from the start of the supply of ammonia to the heat exchanger 60*a* from the ammonia supply source 90.

However, since the pressure in the heat exchanger 60*a* in this embodiment is lower than that in the first embodiment as described above, the concentration of the residual gas ammonia included in the decomposition gas PG generated through the thermal decomposition of gas ammonia in the heat exchanger 60*a* in this embodiment can be reduced to even lower than that in the first embodiment. For this reason, the amount of NOx included in the combustion gas generated through the combustion of the decomposition gas PG in this embodiment can be made smaller than that in the first embodiment, and the ratio of the flow rate of the decomposition gas PG to the flow rate of all fuel can be increased.

As described above, this embodiment has advantages in that the concentration of residual gas ammonia included in the decomposition gas PG can be reduced, and that the ratio of the flow rate of the decomposition gas PG to the flow rate of all fuel can be increased, as compared to the first embodiment. However, this embodiment is more disadvantageous than the first embodiment in terms of equipment cost and power generation efficiency. In this embodiment, the pressure reducer 52 is added to the gas turbine plant of the first embodiment. Moreover, even though the pressure of the decomposition gas PG flowing out of the heat exchanger 60*a* in this embodiment is lower than that in the first embodiment, the pressure of the decomposition gas PG needs to be increased up to a pressure equal to or higher than the same feed pressure as that of the first embodiment by the decomposition gas compressor 85. For this reason, a decomposition gas compressor 85 which has boosting capacity higher than that of the decomposition gas compressor 85 of the first embodiment is required. Accordingly, this embodiment is more disadvantageous than the first embodiment in terms of equipment cost. Further, since the decomposition gas compressor 85 of this embodiment needs to increase the pressure of gas which is lower than that of the first embodiment up to a pressure equal to or higher than the same feed pressure as that of the first embodiment, energy required to drive the decomposition gas compressor 85 is larger than that of the first embodiment. Accordingly, this embodiment is more disadvantageous than the first embodiment in terms of power generation efficiency.

In other words, since liquid ammonia which has a pressure not lower than 0.3 MPa that is the pressure required for the transport of liquid ammonia is made to flow as is into the heat exchanger 60 in the first embodiment, the pressure reducer 52 is not necessary. Further, since the pressure of the decomposition gas PG flowing out of the heat exchanger 60 in the first embodiment is higher than that in the second embodiment, a decomposition gas compressor 85 which has boosting capacity lower than that of the decomposition gas compressor 85 of the second embodiment is enough. Accordingly, the first embodiment is more advantageous than the second embodiment in terms of equipment cost. Furthermore, since the decomposition gas compressor 85 of the first embodiment has only to increase the pressure of gas which is higher than that of the second embodiment up to a pressure equal to or higher than the same feed pressure as that of the second embodiment, energy required to drive the decomposition gas compressor 85 is smaller than that of the second embodiment. Accordingly, the first embodiment is more advantageous than the second embodiment in terms of power generation efficiency.

As described above, each of the first and second embodiments has advantages and disadvantages with respect to the other embodiment. For this reason, it is preferable that which of the first and second embodiments to select be determined by comparing and weighing the advantages of the second embodiment and the disadvantages of the second embodiment, that is, the advantages of the first embodiment.

In this embodiment, the preheater 53 disposed outside the heat exchanger 60*a* may be omitted and a preheater may be provided as a part of the heat exchanger 60*a*. In this case, this preheater exchanges heat between ammonia gas and the exhaust gas EG to heat the ammonia gas. Further, in a case where the pressure of liquid ammonia which has been sent from the ammonia pump 93 is to be reduced to a pressure of 0.1 MPa by the pressure reducer 52, the liquid ammonia can be almost reliably converted into ammonia gas by the pressure reducer 52. Accordingly, a preheater as a part of the heat exchanger 60*a* is not provided and the preheater 53 disposed outside the heat exchanger 60*a* may be omitted.

In the first embodiment and this embodiment, the flow rate of hydrogen gas supplied to the combustor 14 increases in a case where the ratio of the flow rate of the decomposition gas PG to the flow rate of all fuel is high. For this reason, it is preferable in the first embodiment and this embodiment that a combustor 14 suitable for the combustion of hydrogen gas be used as the combustor 14 in a case where the ratio of the flow rate of the decomposition gas PG to the flow rate of all fuel is high. Particularly, since the ratio of the flow rate of the decomposition gas PG to the flow rate of all fuel in this embodiment can be made higher than that in the first embodiment, it is preferable that a combustor 14 suitable for the combustion of hydrogen gas be used as the combustor 14.

Third Embodiment

Figure 10:
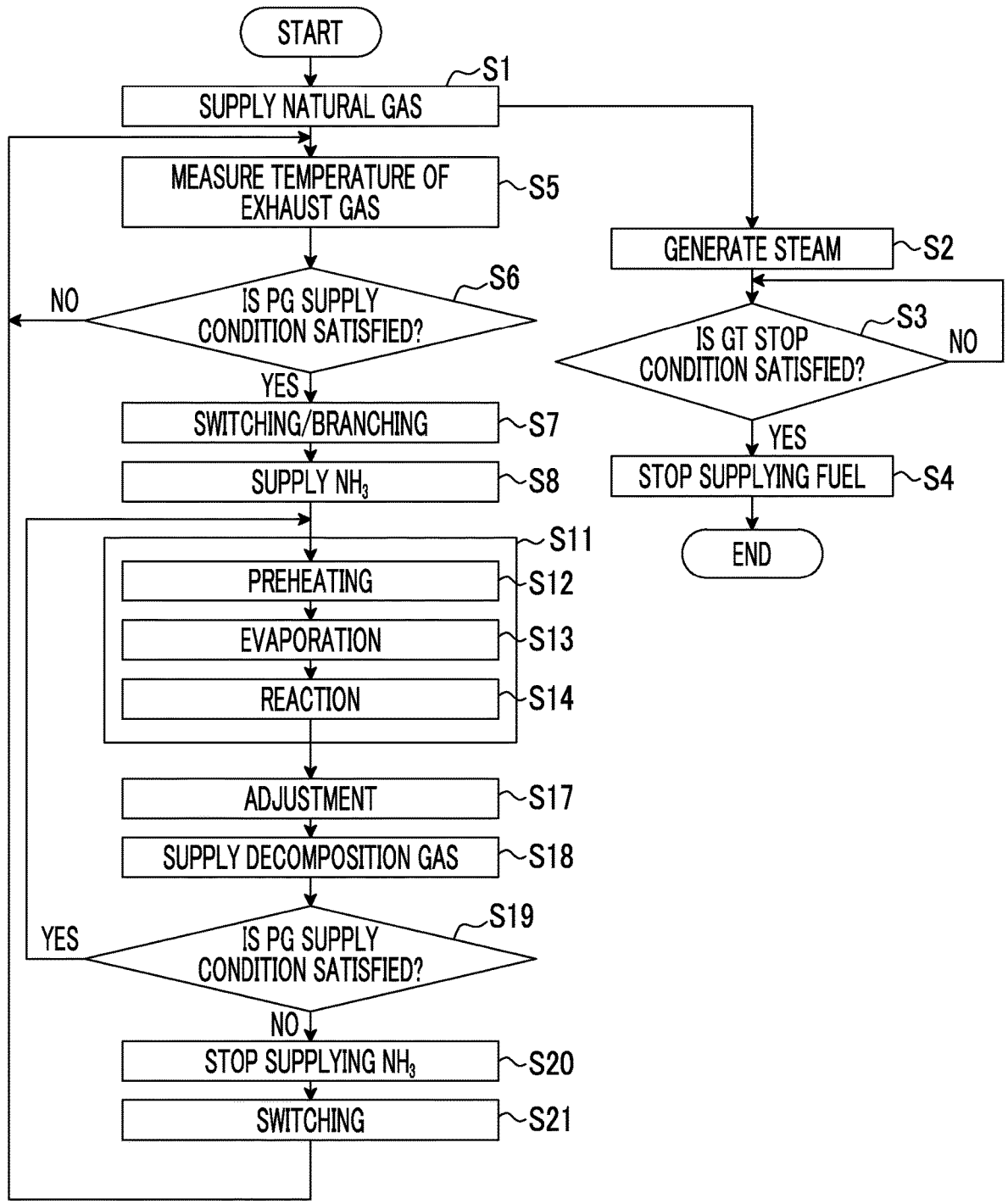
FIG. 10 is a flowchart showing the operation of the gas turbine plant according to the third embodiment of the invention.

A third embodiment of a gas turbine plant will be described with reference to FIGS. 8 to 10.

Figure 8:
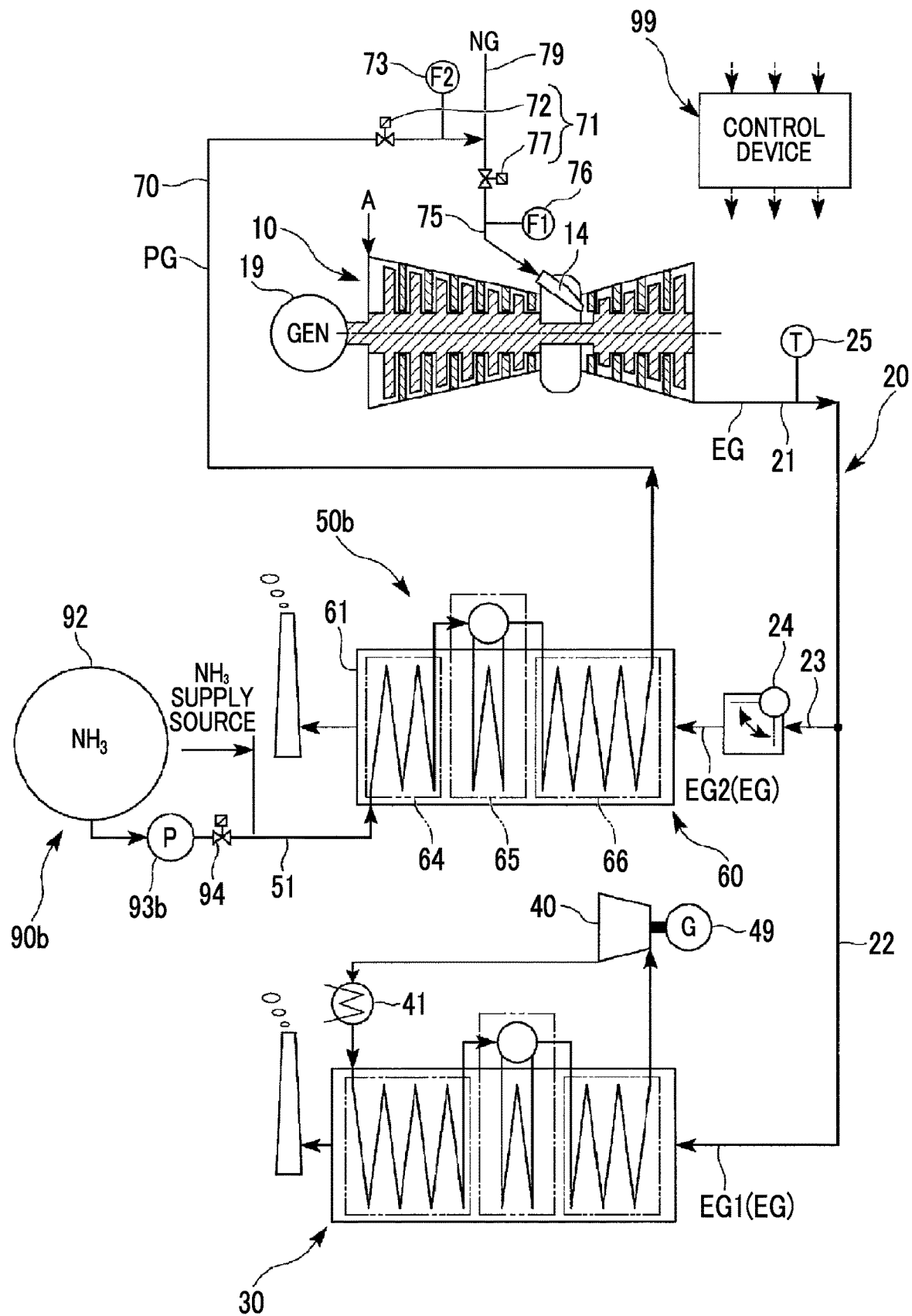
FIG. 8 is a system diagram of a gas turbine plant according to a third embodiment of the invention.

As shown in FIG. 8, an ammonia supply source 90*b* of this embodiment supplies ammonia which has a pressure equal to or higher than a feed pressure (for example, 5 MPa) to a heat exchanger 60 as a heating device of the gas turbine plant of this embodiment. That is, an ammonia pump 93*b* of the ammonia supply source 90*b* of this embodiment increases the pressure of liquid ammonia which has been sent from the ammonia tank 92 to a pressure equal to or higher than the feed pressure (for example, 5 MPa), and sends the liquid ammonia to the heat exchanger 60.

The heat exchanger 60 of the gas turbine plant of this embodiment includes a preheater 64, an evaporator 65, and a reactor 66 as with the heat exchanger 60 of the first embodiment. The reactor 66 and a fuel line 75 are connected to each other through a decomposition gas line 70 as in the first embodiment. As in the first embodiment, the decomposition gas line 70 is provided with a decomposition gas flow meter 73 and a decomposition gas control valve 72. However, the decomposition gas line 70 is not provided with the cooler 80, the decomposition gas compressor 85, and the boost coolers 87 of the first embodiment. That is, decomposition gas supply equipment 50*b* of this embodiment is equipment where the cooler 80, the decomposition gas compressor 85, and the boost coolers 87 are omitted from the decomposition gas supply equipment 50 of the first embodiment.

The configuration of a gas turbine 10, an exhaust gas line 20, a heat recovery steam generator 30, a steam turbine 40, a condenser 41, and the like of this embodiment is the same as that of the first embodiment.

The molar fractions of ammonia gas, hydrogen gas, and nitrogen gas which are obtained under an environment where (cesium oxide+ruthenium) catalyst (for example, $Cs_2O/Ru/Mg$—Al having been described above) is used as a catalyst at a pressure of 5 MPa, are shown in FIG. 9. Thus, after the temperature exceeds about 100° C., the ammonia gas starts to decompose and the molar fraction of the ammonia gas gradually reduces as in the cases of 1 MPa and 0.1 MPa. On the other hand, the molar fractions of the hydrogen gas and the nitrogen gas gradually increase conversely. After the temperature exceeds about 200° C., the molar fraction of the ammonia gas rapidly reduces. After the temperature exceeds 500° C., the molar fraction of the ammonia gas reaches about 0.05. At the pressure of 5 MPa, even when the temperature of the ammonia gas reaches 600° C., the molar fraction of the ammonia gas is close to 0 but does not reach substantially 0. Accordingly, in this embodiment, ammonia gas remains in the gas flowing out of the reactor 66 even in a case where the temperature of gas flowing out of the reactor 66 is 600° C. Specifically, 2.3 mol % of ammonia gas remains. The concentration (2.3 mol %) of residual ammonia gas included in the decomposition gas PG in this embodiment is higher than the concentration (0.49 mol %) of the residual ammonia gas included in the decomposition gas PG in the first embodiment. The reason for this is that the pressure of ammonia gas under a decomposition reaction environment, that is, pressure in the heat exchanger 60 is higher than that of the first embodiment.

Next, the operation of the gas turbine plant of this embodiment will be briefly described with reference to a flowchart shown in FIG. 10.

S1 to S8 are also performed in the gas turbine plant of this embodiment as in the gas turbine plant of the first embodiment.

After the ammonia supply step (S8) is started, the heating step (S11) performed by the heat exchanger 60 is performed also in this embodiment as in the first embodiment. As in the first embodiment, the preheating step (S12) performed by the preheater 64, the evaporation step (S13) performed by the evaporator 65, and the reaction step (S14) performed by the reactor 66 are performed also in the heating step (S11).

Unlike in the first embodiment, the decomposition gas PG flowing out of the heat exchanger 60 is not subjected to the cooling step (S15) and the boosting/boosting-cooling step (S16) and is supplied to the combustor 14 (S18) after the ratio of the flow rate of the decomposition gas PG to the flow rate of all fuel gas is adjusted by the adjuster (S17: adjustment step).

Since the pressure in the heat exchanger 60 is higher than that in the first embodiment, the concentration of residual gas ammonia included in the decomposition gas PG generated through the thermal decomposition of gas ammonia in the heat exchanger 60 in this embodiment is higher than that in the first embodiment. For this reason, a predetermined value relating to the ratio of the flow rate of the decomposition gas PG to the flow rate of all fuel gas in the adjustment step (S17) of this embodiment, that is, the ratio stored in the control device 99 is smaller than that of the first embodiment. Accordingly, the amount of the decomposition gas PG supplied to the combustor 14 in this embodiment is smaller than that in the first embodiment.

Then, as in the first embodiment, the control device 99 determines whether or not the supply condition of the decomposition gas PG is satisfied (S19: PG supply condition determination step). If the supply condition of the decomposition gas PG is satisfied, the steps from the heating step (S11) to the PG supply condition determination step (S19) are repeatedly performed. On the other hand, if the control device 99 determines that the supply condition of the decomposition gas PG is not satisfied in the PG supply condition determination step (S19), the control device 99 instructs the ammonia supply source 90 to stop supplying ammonia as in the first embodiment. As a result, the supply of ammonia to the heat exchanger 60 from the ammonia supply source 90 is stopped (S20: ammonia supply stopping step).

After the control device 99 instructs the ammonia supply source 90 to stop supplying ammonia, the control device 99 instructs the switcher 24 to return to the first state from the second state as in the first embodiment (S21: switching step). As a result, the exhaust gas EG exhausted from the gas turbine 10 does not flow through the second exhaust gas line 23 and flows through only the first exhaust gas line 22. Then, processing returns to the temperature measurement step (S5).

As described above, also in this embodiment, an existing general gas turbine plant can be easily changed into the gas turbine plant of this embodiment for the same reason as the reason described in the first embodiment. Further, even in a case where the temperature of the exhaust gas EG does not reach a temperature required for the decomposition of ammonia at the time of start of the gas turbine 10, or the like, the heat of the exhaust gas EG can be effectively used in the heat recovery steam generator 30 also in the gas turbine plant of this embodiment.

Furthermore, after the temperature of the exhaust gas EG reaches a temperature equal to or higher than a predetermined temperature, the exhaust gas EG starts to flow into the heat exchanger 60 (S7) and ammonia starts to be supplied to the heat exchanger 60 from the ammonia supply source 90 (S8) also in this embodiment. For this reason, also in this embodiment, the amount of NOx included in the combustion gas generated through the combustion of the decomposition gas PG can be reduced from the start of the supply of ammonia to the heat exchanger 60 from the ammonia supply source 90 as in the first embodiment.

Since the pressure in the heat exchanger 60 in this embodiment is higher than that in the first embodiment as described above, the concentration of the residual gas ammonia included in the decomposition gas PG generated through the thermal decomposition of gas ammonia in the heat exchanger 60 in this embodiment is higher than that in the first embodiment. For this reason, the amount of NOx included in the combustion gas generated through the combustion of the decomposition gas PG is larger, and the ratio of the flow rate of the decomposition gas PG to the flow rate of all fuel is lower, in this embodiment than in in the first embodiment.

However, since the decomposition gas PG is used as a part of fuel of the combustion gas but the cooler 80, the decomposition gas compressor 85, and the boost coolers 87 of the first embodiment are not provided in this embodiment, equipment cost can be significantly reduced. In addition, since the decomposition gas compressor 85 is not provided and energy required to drive the decomposition gas compressor 85 is not necessary in this embodiment, this embodiment is more advantageous than the first embodiment in terms of power generation efficiency.

First Modification Example

Figure 11:
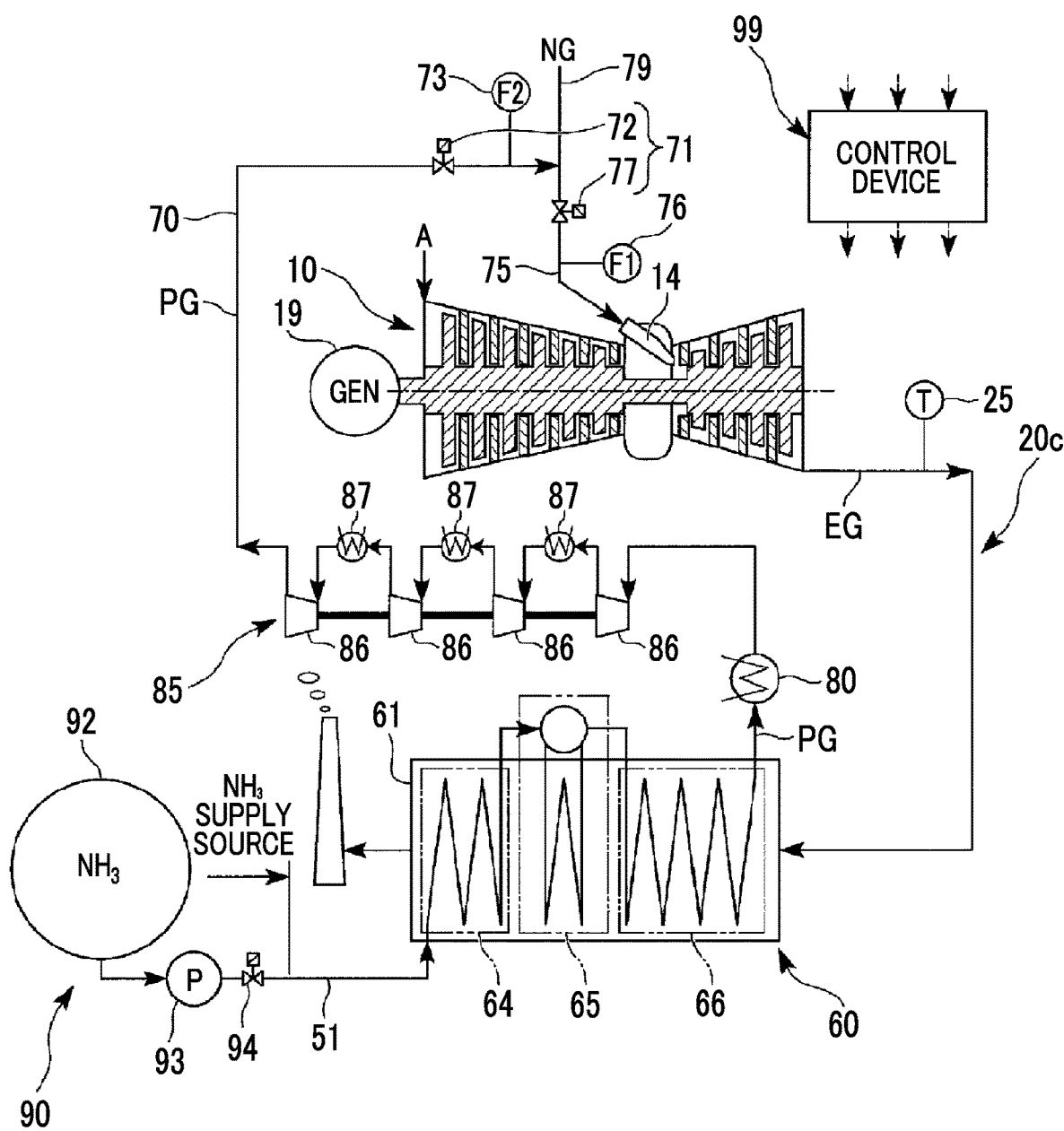
FIG. 11 is a system diagram of a gas turbine plant according to a first modification example of the invention.

A first modification example of the gas turbine plant of the first embodiment will be described with reference to FIG. 11.

The gas turbine plant of this modification example is a plant where the heat recovery steam generator 30, the steam turbine 40, the condenser 41, the first exhaust gas line 22, and the switcher 24 are omitted from the gas turbine plant of the first embodiment. For this reason, in the gas turbine plant of this modification example, an exhaust gas line 20*c* does not branch and the exhaust gas line 20*c* is connected to the heat exchanger 60 as a heating device.

Since the gas turbine plant of this modification example does not include the heat recovery steam generator 30 as described above, the steam generation step (S3) of the gas turbine plant of the first embodiment is not performed in the gas turbine plant. Further, since the exhaust gas line 20*c* does not branch and the switcher 24 is not provided in the gas turbine plant of this modification example, the switching/branching step (S7) and the switching step (S21) of the gas turbine plant of the first embodiment are not performed in this gas turbine plant. Accordingly, if the control device 99 determines that the supply condition of the decomposition gas PG is satisfied in the PG supply condition determination step (S6), the switching/branching step (S7) is not performed and the ammonia supply step (S8) is immediately performed in this modification example. As described above, in this modification example, ammonia supplied from the ammonia supply source 90 starts to be supplied to the heat exchanger 60 after the supply condition of the decomposition gas PG is satisfied. Accordingly, the amount of NOx included in the combustion gas generated through the combustion of the decomposition gas PG can be reduced from the start of the supply of ammonia to the heat exchanger 60 from the ammonia supply source 90. Further, after the control device 99 determines that the supply condition of the decomposition gas PG is not satisfied in the PG supply condition determination step (S19) and the ammonia supply stopping step (S20) is performed, the switching step (S21) is not performed and processing immediately returns to the temperature measurement step (S5) in this modification example.

This modification example is a modification example of the first embodiment, but the second embodiment may also be modified in the same way as this modification example. That is, the heat recovery steam generator 30, the steam turbine 40, the condenser 41, the first exhaust gas line 22, and the switcher 24 may be omitted from the gas turbine plant of the second embodiment.

Second Modification Example

Figure 12:
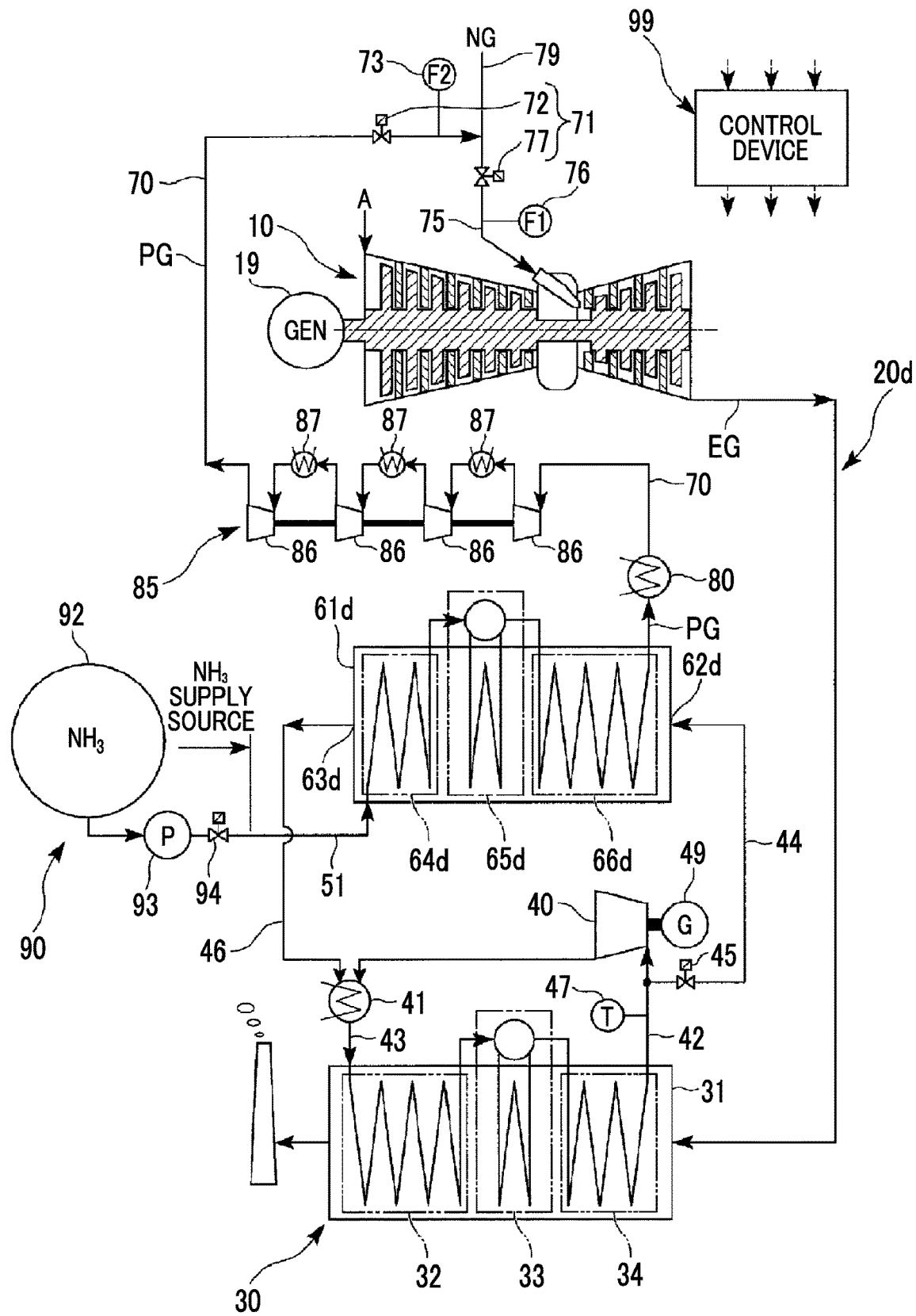
FIG. 12 is a system diagram of a gas turbine plant according to a second modification example of the invention.

A second modification example of the gas turbine plant of the first embodiment will be described with reference to FIG. 12.

The gas turbine plant of this modification example is a plant that uses steam as an object (heat medium) to be subjected to heat exchange with ammonia in a heat exchanger 60*d* as a heating device. Accordingly, the heat exchanger 60*d* of this modification example includes a heat exchanger frame 61*d* through which steam flows, a preheater 64*d* that is disposed in the heat exchanger frame 61*d*, an evaporator 65*d* of which a part is disposed in the heat exchanger frame 61, and a reactor 66*d* that is disposed in the heat exchanger frame 61*d*. The heat exchanger frame 61*d* is provided with a steam inlet 62*d* and a steam outlet 63*d*. The preheater 64*d*, the evaporator 65*d*, and the reactor 66*d* are arranged in the heat exchanger frame 61*d* in this order toward the steam inlet 62*d* from the steam outlet 63*d*.

The steam line 42 which connects the superheater 34 of the heat recovery steam generator 30 to the steam turbine is provided with a thermometer 47 that measures the temperature of steam flowing through the steam line 42. A first end of a heat exchange steam line 44 is connected to the steam line 42. A second end of the heat exchange steam line 44 is connected to the steam inlet 62*d* of the heat exchanger frame 61*d*. The heat exchange steam line 44 is provided with a steam control valve 45 that adjusts the flow rate of steam flowing through the heat exchange steam line 44. A first end of a steam recovery line 46 is connected to the steam outlet 63d of the heat exchanger frame 61d. A second end of the steam recovery line 46 is connected to the condenser 41. Accordingly, a part of steam which has been generated by the heat recovery steam generator 30 is sent to the heat exchanger 60d through the heat exchange steam line 44. Steam which has flowed through the heat exchanger 60d is sent to the condenser 41 through the steam recovery line 46. This steam is converted back into water in the condenser 41, and the water is sent to the heat recovery steam generator 30 through the water supply line 43.

Exhaust gas EG is not supplied to the heat exchanger 60d of this modification example. Therefore, an exhaust gas line 20d of this modification example is connected to the heat recovery steam generator 30 without branching. Accordingly, the exhaust gas line 20d of this modification example is not provided with a switcher 24.

Exhaust gas EG is not supplied to the heat exchanger 60d of this modification example as described above. For this reason, in the temperature measurement step (S5), the temperature of steam flowing through the steam line 42 is measured by the thermometer 47 instead of the measurement of the temperature of exhaust gas EG. Further, the supply condition of the decomposition gas PG determined in the PG supply condition determination step (S6, S19) does not include a condition that the temperature of exhaust gas EG is equal to or higher than a predetermined temperature, and instead includes a condition that the temperature of steam flowing through the steam line 42 is equal to or higher than a predetermined temperature. If the control device 99 determines that the supply condition of the decomposition gas PG is satisfied in the PG supply condition determination step (S6), a heat exchange steam supply step is performed instead of the switching/branching step (S7). In the heat exchange steam supply step, the control device 99 instructs the steam control valve 45 to be opened. As a result, the steam control valve 45 is opened, and a part of steam flowing through the steam line 42 is supplied to the heat exchanger 60d through the heat exchange steam line 44. After the heat exchange steam supply step is performed, the ammonia supply step (S8) is performed as in the first embodiment. Further, after the control device 99 determines that the supply condition of the decomposition gas PG is not satisfied in the PG supply condition determination step (S19) and the ammonia supply stopping step (S20) is performed, the switching step (S21) is not performed and a heat exchange steam supply stopping step is performed in this modification example. In this modification example, processing returns to the temperature measurement step (S5) after the heat exchange steam supply stopping step is performed.

In a case where an existing general gas turbine plant including the gas turbine 10 and the heat recovery steam generator 30 is to be modified into the gas turbine plant of this modification example, the steam line 42 is modified but the exhaust gas line 20 is not modified in this modification example. For this reason, an existing general gas turbine plant is more easily modified into the gas turbine plant of this modification example than the gas turbine plant of the first embodiment.

Further, since the flow rate of steam which flows into the heat exchanger 60d can be easily changed by the change of the valve opening degree of the steam control valve 45 in this modification example, the amount of heat exchanged with ammonia having a constant flow rate can be easily changed.

In this modification example, steam exhausted from the heat exchanger 60d returns to the condenser 41. However, a reheater may be provided in the heat recovery steam generator 30, and steam exhausted from the heat exchanger 60d may be sent to the reheater and may be sent to the steam line 42 after being superheated by the reheater. Further, this modification example is a modification example of the first embodiment, but the second embodiment may also be modified in the same way as this modification example. That is, exhaust gas EG is not supplied to the heat exchanger of the gas turbine plant of the second embodiment, and steam generated by the heat recovery steam generator 30 may be supplied instead.

Third Modification Example

Figure 13:
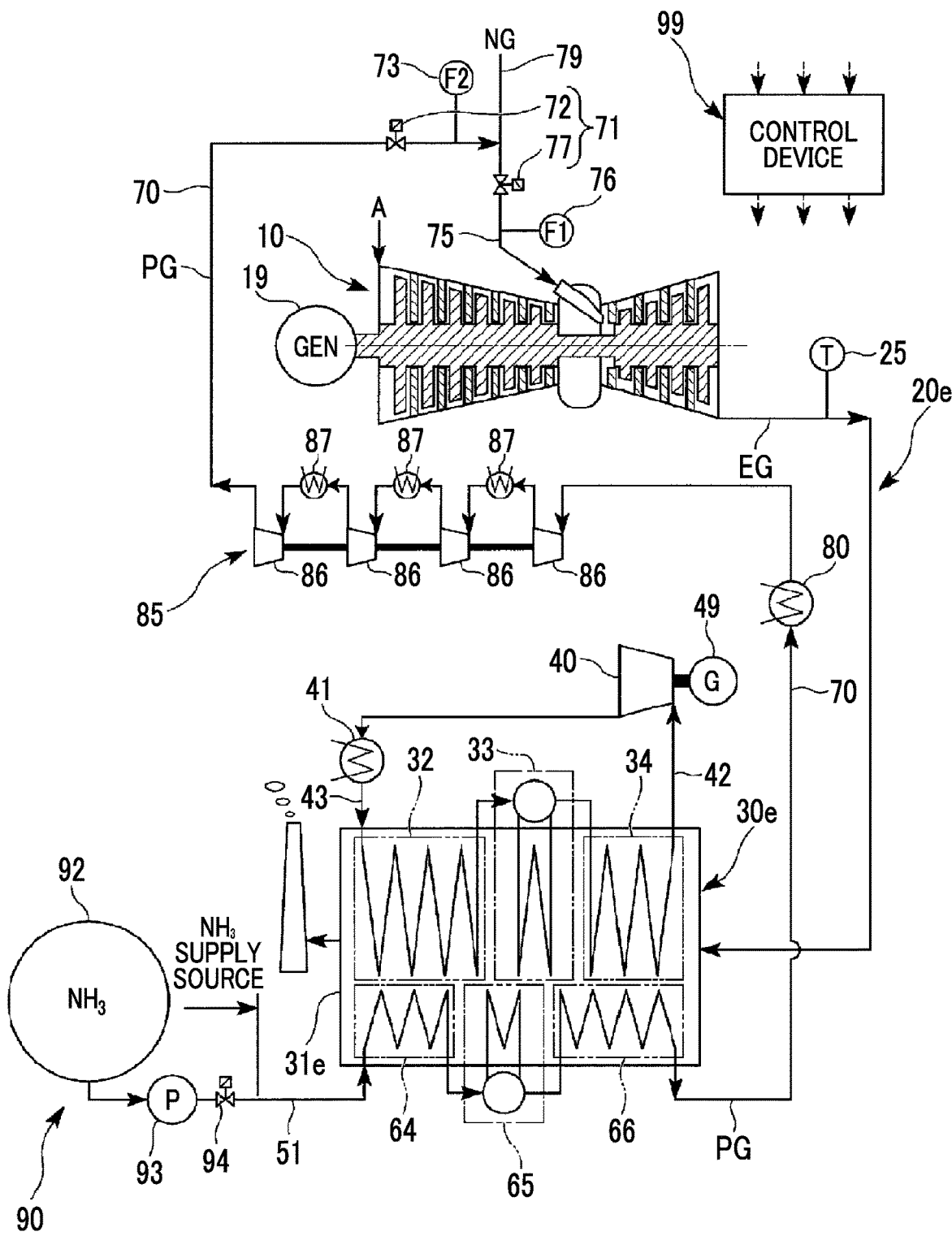
FIG. 13 is a system diagram of a gas turbine plant according to a third modification example of the invention.

A third modification example of the gas turbine plant of the first embodiment will be described with reference to FIG. 13.

The gas turbine plant of this modification example is a gas turbine plant in which a preheater 64, an evaporator 65, and a reactor 66 used to decompose ammonia are arranged in an outer boiler frame 31e of a heat recovery steam generator 30e. Accordingly, a heat exchanger as a heating device of this modification example includes the outer boiler frame 31e of the heat recovery steam generator 30e and the preheater 64, the evaporator 65, and the reactor 66 that are used to decompose ammonia. For this reason, the heat exchanger 60 which is independent of the heat recovery steam generator 30 as in the first embodiment is not present in this modification example. Accordingly, an exhaust gas line 20e of this modification example is connected to the outer boiler frame 31e of the heat recovery steam generator 30e without branching.

Since the exhaust gas line 20e does not branch in this modification example as described above, a switcher 24 is not provided on the exhaust gas line 20e.

Since the exhaust gas line 20e does not branch and a switcher 24 is not provided in the gas turbine plant of this modification example, the switching/branching step (S7) and the switching step (S21) of the gas turbine plant of the first embodiment are not performed in this gas turbine plant as in the first modification example.

This modification example is a modification example of the first embodiment, but the second embodiment may also be modified in the same way as this modification example. That is, the preheater 64, the evaporator 65, and the reactor 66 which are used to decompose ammonia may be arranged in the outer boiler frame 31 of the heat recovery steam generator 30 of the gas turbine plant of the second embodiment.

Fourth Modification Example

Figure 14:
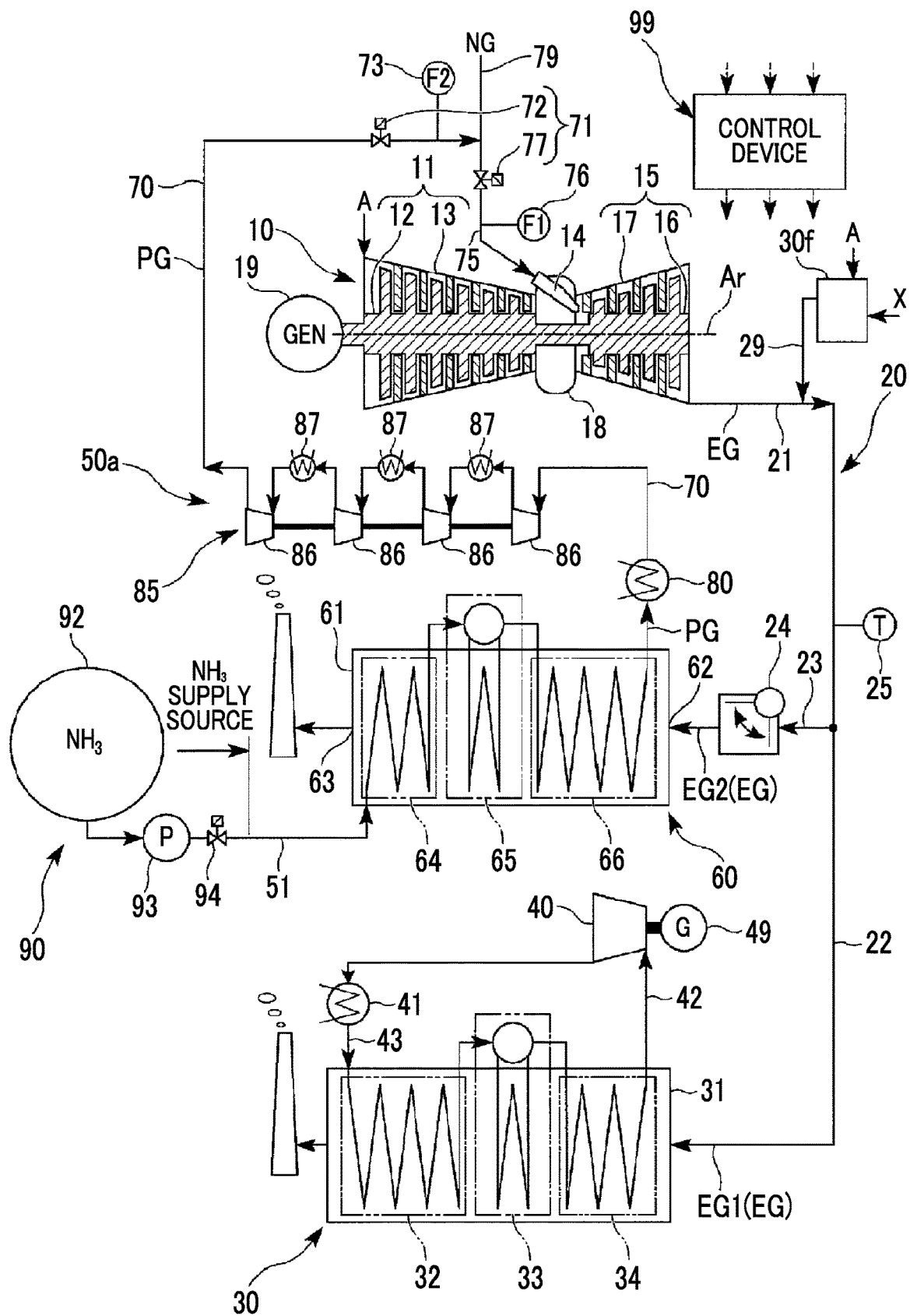
FIG. 14 is a system diagram of a gas turbine plant according to a fourth modification example of the invention.

A fourth modification example of the gas turbine plant of the first embodiment will be described with reference to FIG. 14.

The gas turbine plant of this modification example is a gas turbine plant where an incinerator 30f and a third exhaust gas line 29 guiding exhaust gas exhausted from the incinerator 30f to the main exhaust gas line 21 are added to the gas turbine plant of the first embodiment.

For example, wastes X and the like including combustible materials and air A are fed to the incinerator 30f. In the incinerator 30f, the wastes X and the like are combusted in the air A. A first end of the third exhaust gas line 29 is connected to the incinerator 30f. Further, a second end of the third exhaust gas line 29 is connected to the main exhaust gas line 21. The thermometer 25 is provided on the main exhaust gas line 21, on the downstream side of a position where the main exhaust gas line 21 and the third exhaust gas line 29 are connected to each other.

In this modification example, exhaust gas EG exhausted from the gas turbine 10 and exhaust gas exhausted from the incinerator 30f are guided to the heat exchanger 60 and the heat recovery steam generator 30. For this reason, the heat exchanger 60 heats ammonia using at least one of the exhaust gas EG exhausted from the gas turbine 10 and the exhaust gas exhausted from the incinerator 30f as a heat medium. Further, the heat recovery steam generator 30 heats water using at least one of the exhaust gas EG exhausted from the gas turbine 10 and the exhaust gas exhausted from the incinerator 30f as a heat medium.

In this modification example, not only the heat of the exhaust gas EG exhausted from the gas turbine 10 but also the heat of the exhaust gas exhausted from the incinerator 30f is used as a heat source that heats ammonia. For this reason, even when the temperature of the exhaust gas EG exhausted from the gas turbine 10 at the time of start of the gas turbine 10, or the like is not equal to or higher than a predetermined temperature, ammonia can be supplied to the heat exchanger 60 from the ammonia supply source 90 when the temperature of gas which includes the exhaust gas exhausted from the incinerator 30f and the exhaust gas EG exhausted from the gas turbine 10 reaches a temperature equal to or higher than the predetermined temperature due to the exhaust gas exhausted from the incinerator 30f.

As described above, the heat of the exhaust gas exhausted from the incinerator 30f may be used as a heat source which heats ammonia, other than the heat of the exhaust gas EG exhausted from the gas turbine 10.

The exhaust gas EG exhausted from the gas turbine 10 and the exhaust gas exhausted from the incinerator 30f can be introduced into the heat exchanger 60 in this modification example, but only the exhaust gas exhausted from the incinerator 30f may be introduced into the heat exchanger 60.

Further, this modification example is a modification example of the first embodiment, but the second and third embodiments may also be modified in the same way as this modification example.

Fifth Modification Example

Figure 15:
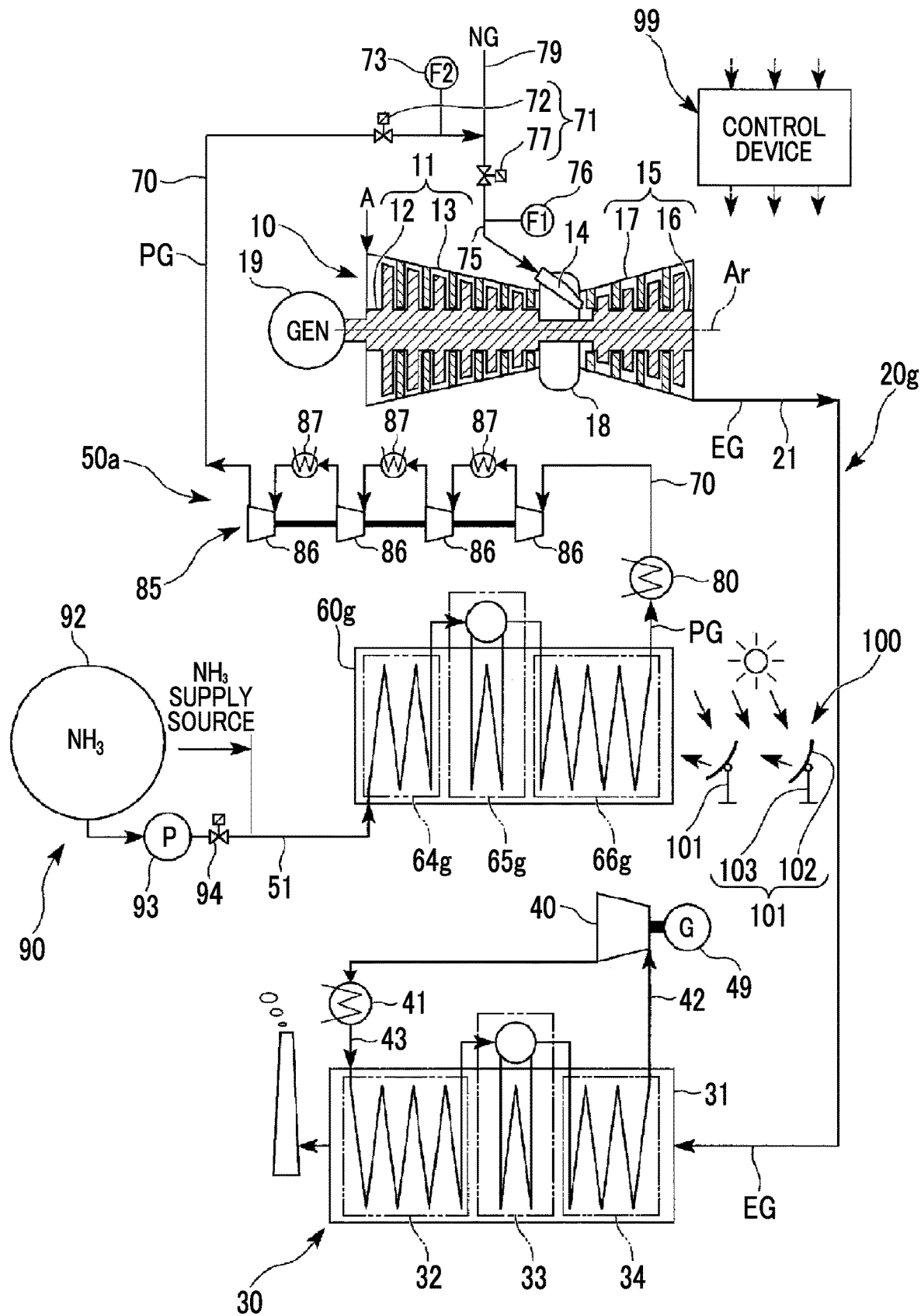
FIG. 15 is a system diagram of a gas turbine plant according to a fifth modification example of the invention.

A fifth modification example of the gas turbine plant of the first embodiment will be described with reference to FIG. 15.

The gas turbine plant of this modification example is a gas turbine plant that includes a heating device 100 which includes a sunlight reflecting device 101 and a heater 60g, instead of the heat exchanger 60 as a heating device of the gas turbine plant of the first embodiment.

The sunlight reflecting device 101 includes a reflective mirror 102 and a mirror drive unit 103 that changes the direction of the reflective mirror 102 to allow sunlight to be guided to the heater 60g. The heater 60g includes a preheater 64g, an evaporator 65g, and a reactor 66g. That is, solar energy is used as a heat source which heats ammonia in this modification example. For this reason, in the gas turbine plant of this modification example, an exhaust gas line 20g is connected to the heat recovery steam generator 30 without branching.

This modification example is a modification example of the first embodiment, but the second embodiment may also be modified in the same way.

As in the fourth and fifth modification examples, a heat source other than the heat of the exhaust gas EG exhausted from the gas turbine 10 may be used as a heat source that heats ammonia. Examples of such a heat source include the waste heat exhausted from a chemical process, the waste heat exhausted from a steel mill, the heat of combustion gas of biomass fuel, and the like in addition to the heat of the exhaust gas exhausted from the incinerator 30f and solar energy.

Other Modification Examples

In each of the embodiments and the modification examples having been described above, the adjuster 71 which adjusts the flow ratio includes the fuel control valve 77 provided on the fuel line 75 and the decomposition gas control valve 72 provided on the decomposition gas line 70. However, the adjuster which adjusts the flow ratio may include a natural gas NG control valve provided on the natural gas line 79 and the decomposition gas control valve 72 provided on the decomposition gas line 70.

Each of the gas turbine plants of the first and second embodiments and the first to fifth modification examples having been described above includes the cooler 80. However, the coolers 80 may be omitted in these gas turbine plants. In this case, since there is a concern that hydrogen gas and nitrogen gas included in the decomposition gas PG may be recombined with each other, there is a concern that the amount of ammonia gas flowing into the combustor 14 may increase. For this reason, it is preferable in this case that a predetermined value relating to the ratio of the flow rate of decomposition gas PG to the flow rate of all fuel gas, that is, the ratio stored in the control device 99 be made small.

INDUSTRIAL APPLICABILITY

According to an aspect of the invention, NOx concentration can be reduced even though ammonia is used as at least a part of fuel.

REFERENCE SIGNS LIST

10: gas turbine
11: air compressor
12: compressor rotor
13: compressor casing
14: combustor
15: turbine
16: turbine rotor
17: turbine casing
18: intermediate casing
19: generator
20, 20c, 20d, 20e: exhaust gas line
21: main exhaust gas line
22: first exhaust gas line
23: second exhaust gas line
24: switcher
25: thermometer
29: third exhaust gas line
30, 30e: heat recovery steam generator
30f: incinerator
31, 31e: outer boiler frame
32: economizer
33: evaporator 34: superheater
40: steam turbine
41: condenser
42: steam line
43: water supply line
44: heat exchange steam line
45: steam control valve
46: steam recovery line
47: thermometer
49: generator
50, 50a, 50b: decomposition gas supply equipment
51: ammonia line
52: pressure reducer
53: preheater
60, 60a, 60d: heat exchanger (heating device)
60g: heater
61, 61a, 61d: heat exchanger frame
62: exhaust gas inlet
62d: steam inlet
63: exhaust gas outlet
63d: steam outlet
64, 64d, 64g: preheater
65, 65d, 65g: evaporator
66, 66a, 66d, 66g: reactor
67: flow channel-forming member
68: catalyst
70: decomposition gas line
71: adjuster
72: decomposition gas control valve
75: fuel line
76: fuel flow meter
77: fuel control valve
79: natural gas line
80: cooler
85: decomposition gas compressor
86: partial booster
87: boost cooler
90, 90b: ammonia supply source
92: ammonia tank
93, 93b: ammonia pump
94: ammonia shut-off valve
99: control device
100: heating device
101: sunlight reflecting device
102: reflective mirror
103: mirror drive unit
EG: exhaust gas
EG1: first exhaust gas
EG2: second exhaust gas
NG: natural gas
PG: decomposition gas

The invention claimed is:

1. A gas turbine plant comprising:
a gas turbine that combusts fuel, is driven by combustion gas generated through combustion of the fuel, and exhausts the combustion gas as exhaust gas;
a heating device that heats ammonia and thermally decomposes the ammonia to convert the ammonia into decomposition gas including hydrogen gas and nitrogen gas;
a decomposition gas line that sends the decomposition gas flowing out of the heating device to the gas turbine; and
a decomposition gas compressor that is provided on the decomposition gas line and increases a pressure of the decomposition gas flowing out of the heating device to a pressure equal to or higher than a feed pressure at which the decomposition gas is allowed to be fed to the gas turbine.

2. The gas turbine plant according to claim 1, further comprising:
a cooler that is provided on the decomposition gas line at a position closer to the heating device than the decomposition gas compressor is and cools the decomposition gas flowing out of the heating device.

3. The gas turbine plant according to claim 1, further comprising:
a boost cooler that cools the decomposition gas of which the pressure is being increased by the decomposition gas compressor.

4. The gas turbine plant according to claim 1,
wherein the heating device includes a reactor that heats and thermally decomposes ammonia gas to generate the decomposition gas.

5. The gas turbine plant according to claim 4,
wherein the reactor includes a catalyst that comes in contact with the ammonia gas and facilitates the thermal decomposition of the ammonia gas.

6. The gas turbine plant according to claim 4,
wherein the heating device includes an evaporator that heats and vaporizes liquid ammonia to convert the liquid ammonia into the ammonia gas.

7. The gas turbine plant according to claim 6,
wherein the heating device includes a preheater that heats the liquid ammonia not yet heated by the evaporator.

8. The gas turbine plant according to claim 1,
wherein a pressure of the ammonia present in the heating device is lower than the feed pressure.

9. The gas turbine plant according to claim 1, further comprising:
a pressure reducer that reduces a pressure of the ammonia and then sends the ammonia to the heating device.

10. The gas turbine plant according to claim 9, further comprising:
a preheater that exchanges heat between the ammonia of which the pressure has been reduced by the pressure reducer and an external medium to heat the ammonia and then sends the ammonia to the heating device as ammonia gas.

11. The gas turbine plant according to claim 1, further comprising:
a natural gas line that sends natural gas to the gas turbine as at least a part of the fuel; and
an adjuster that adjusts a ratio of a flow rate of the decomposition gas to a flow rate of all fuel gas including the natural gas and the decomposition gas supplied to the gas turbine.

12. The gas turbine plant according to claim 11, further comprising:
a control device that instructs the adjuster of a value relating to the ratio of the flow rate of the decomposition gas to the flow rate of the all fuel gas that is a value predetermined according to a pressure of the ammonia present in the heating device.

13. The gas turbine plant according to claim 12,
wherein the predetermined value relating to the ratio of the flow rate of the decomposition gas to the flow rate of the all fuel gas is reduced as the pressure of the ammonia present in the heating device increases.

14. The gas turbine plant according to claim 1, further comprising:
an exhaust gas line through which the exhaust gas exhausted from the gas turbine flows, wherein the heating device includes a heat exchanger that is provided on the exhaust gas line and exchanges heat between the exhaust gas as a heat medium and the ammonia to heat the ammonia.

15. The gas turbine plant according to claim 14, further comprising:
a boiler that is provided on the exhaust gas line and exchanges heat between water and the exhaust gas to heat the water and convert the water to steam,
wherein the exhaust gas line includes a first exhaust gas line and a second exhaust gas line,
the boiler is provided on the first exhaust gas line, and
the heat exchanger is provided on the second exhaust gas line.

16. The gas turbine plant according to claim 15, further comprising:
a switcher that changes a flow of the exhaust gas between a first state where the exhaust gas flows through only the first exhaust gas line of the first and second exhaust gas lines and a second state where the exhaust gas flows through at least the second exhaust gas line.

17. An operating method for a gas turbine plant including a gas turbine that combusts fuel, is driven by combustion gas generated through combustion of the fuel, and exhausts the combustion gas as exhaust gas, the method comprising:

a heating step of heating ammonia and thermally decomposing the ammonia to convert the ammonia into decomposition gas including hydrogen gas and nitrogen gas;
a boosting step of increasing a pressure of the decomposition gas to a pressure equal to or higher than a feed pressure at which the decomposition gas is allowed to be fed to the gas turbine; and
a decomposition gas supply step of supplying the decomposition gas of which the pressure has been increased in the boosting step to the gas turbine as at least a part of the fuel.

18. The operating method for a gas turbine plant according to claim 17, further comprising:
a cooling step of cooling the decomposition gas of which the pressure is not yet increased in the boosting step and increasing the pressure of the cooled decomposition gas in the boosting step.

19. The gas turbine plant according to claim 1, wherein a pressure of the ammonia present in the heating device is lower than the feed pressure, and the pressure of the ammonia present in the heating device is equal to or greater than 0.3 MPa and less than 5 MPa.

* * * * *